United States Patent
Li et al.

(10) Patent No.: US 10,547,402 B2
(45) Date of Patent: Jan. 28, 2020

(54) HYBRID MULTIPLEXING FOR MISSION CRITICAL INFORMATION

(71) Applicant: QUALCOMM Incorporated, San Diego, CA (US)

(72) Inventors: Chong Li, Weehawken, NJ (US); Hao Xu, San Diego, CA (US); Jamie Menjay Lin, San Diego, CA (US); Chih Ping Li, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/625,857

(22) Filed: Jun. 16, 2017

(65) Prior Publication Data

US 2018/0115380 A1     Apr. 26, 2018

Related U.S. Application Data

(60) Provisional application No. 62/412,012, filed on Oct. 24, 2016.

(51) Int. Cl.
*H04W 4/00*         (2018.01)
*H04J 4/00*          (2006.01)
(Continued)

(52) U.S. Cl.
CPC .............. *H04J 4/00* (2013.01); *H04L 5/0053* (2013.01); *H04W 72/048* (2013.01);
(Continued)

(58) Field of Classification Search
CPC ........ H04J 4/00; H04L 5/0044; H04L 5/0064; H04L 5/0094; H04L 5/0053;
(Continued)

(56) References Cited

U.S. PATENT DOCUMENTS

2015/0334685 A1   11/2015   Ji et al.
2016/0128090 A1    5/2016   Azarian Yazdi et al.
(Continued)

OTHER PUBLICATIONS

Convida Wireless: "On Downlink Control Channel Design for New Radio", 3GPP Draft; R1-1610379, 3rd Generation—Partnership Project (3GPP), Mobile Competence Centre, 650, Route Des Lucioles, F-06921 Sophia-Antipolis Cedex, France, vol. RAN WG1, No. Lisbon. Portugal: Oct. 10, 2016-Oct. 14, 2016: Oct. 1, 2016 (Oct. 1, 2016), XP051160042, 4 pages, Retrieved from the Internet: URL:http://www.3gpp.org/ftp/tsg_ran/WG1_RD/TSGR1_86b/Docs/, [retrieved on Oct. 1, 2016].

(Continued)

*Primary Examiner* — Bo Hui A Zhu
(74) *Attorney, Agent, or Firm* — Holland & Hart LLP/Qualcomm

(57) ABSTRACT

Methods, systems, and devices for wireless communication are described. A wireless communication network may support mission critical (MiCr) communications and mobile broadband (MBB) communications with hybrid multiplexing (e.g., time division multiplexing (TDM) and frequency division multiplexing (FDM)). A base station may identify a first set of resources allocated for MiCr communications and a second set of resources allocated for MBB communications. The first and second set of resources may be multiplexed in the frequency domain, and the base station may transmit MiCr information over the first set of resources under normal data traffic conditions. As data traffic or other conditions associated with MiCr communications change, the base station may schedule MiCr transmissions on the second set of resources allocated for MBB communications, by puncturing the second set of resources for the MiCr communications.

30 Claims, 16 Drawing Sheets

(51) Int. Cl.
*H04L 5/00* (2006.01)
*H04W 72/04* (2009.01)
*H04W 72/08* (2009.01)

(52) U.S. Cl.
CPC ... *H04W 72/0446* (2013.01); *H04W 72/0453* (2013.01); *H04W 72/085* (2013.01)

(58) Field of Classification Search
CPC ......... H04W 72/0453; H04W 72/0446; H04W 72/048; H04W 72/1252
See application file for complete search history.

(56) References Cited

U.S. PATENT DOCUMENTS

| 2016/0261321 A1 | 9/2016 | Andgart et al. |
| 2016/0270116 A1 | 9/2016 | Lin et al. |
| 2016/0374022 A1 | 12/2016 | Ang et al. |

OTHER PUBLICATIONS

International Search Report and Written Opinion—PCT/US2017/058066—ISA/EPO—dated Jan. 31, 2018.
Sharp., et al, "Channel Coding Schemes for eMBB and URLLC Coexistence", 3GPP Draft; R1-167913, 3rd Generation Partnership Project (3GPP), Mobile Competence Centre; 650, Route Des Lucioles: F-06921 Sophia-Antipolis Cedex; France; vol. RAN WG1, No. Gothenburg, Sweden; Aug. 22, 2016-Aug. 26, 2016; Aug. 22, 2016 (Aug. 22, 2016), XP051126181, pp. 1-10, Retrieved from the Internet: URL: http://www.3gpp.org/ftp/Meetings_3GPP_SYNC/RAN1/Docs/, [retrieved on Aug. 22, 2016].

HYBRID MULTIPLEXING FOR MISSION CRITICAL INFORMATION

CROSS REFERENCES

The present Application for Patent claims priority to U.S. Provisional Patent Application No. 62/412,012 entitled "Hybrid Multiplexing For Mission Critical Information," filed Oct. 24, 2016, assigned to the assignee hereof.

BACKGROUND

The following relates generally to wireless communication and more specifically to hybrid multiplexing for mission critical (MiCr) information.

Wireless communications systems are widely deployed to provide various types of communication content such as voice, video, packet data, messaging, broadcast, etc. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A wireless communications system may support mobile broadband (MBB) communications and MiCr communications over a system bandwidth. MiCr communications may be associated with low latency, high reliability, and, in some cases, bursty and unpredictable transmissions. Due to the unpredictability of MiCr applications, it may be difficult for a base station to allocate an appropriate amount of resources for MiCr communications without significantly impacting MBB communications.

SUMMARY

A wireless communications system may support different types of communications including, for example, mission critical (MiCr) communications and mobile broadband (MBB) (or enhanced MBB (eMBB)) communications. Resources used for the different types of communications may be multiplexed according to a hybrid multiplexing scheme (e.g., using time division multiplexing (TDM) and frequency division multiplexing (FDM)). And the hybrid multiplexing may allow for quick reallocation of resources (e.g., from MBB to MiCr) to accommodate sudden changes in demand.

A base station may identify a first set of resources allocated for MiCr communications and a second set of resources allocated for MBB communications, and the first and second set of resources may be multiplexed in the frequency domain. The base station may transmit MiCr information over the first set of resources under normal data traffic conditions. However, in some cases, the data traffic for MiCr communications may increase spontaneously, and the capacity of the first set of resources may be insufficient for the MiCr communications. Accordingly, the base station may schedule MiCr transmissions on the second set of resources allocated for MBB communications. That is, the base station may puncture the resources allocated for MBB communications in order to support MiCr communications.

A method of wireless communication is described. The method may include identifying a first set of resources allocated for control and data signaling for a first type of communications having a first nominal latency constraint, where the first set of resources includes a first frequency region of a system bandwidth and a first set of transmission time intervals (TTIs) each having a first duration, identifying a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint, and transmitting data for the first type of communications on resources of the second set of resources.

An apparatus for wireless communication is described. The apparatus may include means for identifying a first set of resources allocated for control and data signaling for a first type of communications having a first nominal latency constraint, where the first set of resources includes a first frequency region of a system bandwidth and a first set of TTIs each having a first duration, means for identifying a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint, and means for transmitting data for the first type of communications on resources of the second set of resources.

Another apparatus for wireless communication is described. The apparatus may include a processor, memory in electronic communication with the processor, and instructions stored in the memory. The instructions may be operable to cause the processor to identify a first set of resources allocated for control and data signaling for a first type of communications having a first nominal latency constraint, where the first set of resources includes a first frequency region of a system bandwidth and a first set of TTIs each having a first duration, identify a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint, and transmit data for the first type of communications on resources of the second set of resources.

A non-transitory computer readable medium for wireless communication is described. The non-transitory computer-readable medium may include instructions operable to cause a processor to identify a first set of resources allocated for control and data signaling for a first type of communications having a first nominal latency constraint, where the first set of resources includes a first frequency region of a system bandwidth and a first set of TTIs each having a first duration, identify a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint, and transmit data for the first type of communications on resources of the second set of resources.

In some examples of the method, apparatus, and non-transitory computer-readable medium described above, the second frequency region is frequency-division multiplexed with the first frequency region. In some examples of the method, apparatus, and non-transitory computer-readable medium described above, transmitting the data for the first type of communications on resources of the second set of resources includes puncturing the second set of resources for the transmission of the data for the first type of communications. In some examples of the method, apparatus, and non-transitory computer-readable medium described above, identifying the first set of resources allocated for control and data signaling for the first type of communications includes identifying the first set of resources allocated for control and data signaling for the first type of communications based on a pattern of data traffic associated with the first type of communications.

In some examples of the method, apparatus, and non-transitory computer-readable medium described above, the second set of resources includes a first subset of resources reserved for the second type of communications and a second subset of resources available for the first type of communications. In some examples of the method, apparatus, and non-transitory computer-readable medium described above, transmitting the data for the first type of communications includes transmitting the data for the first type of communications on the second subset of resources available for the first type of communications. In some examples of the method, apparatus, and non-transitory computer-readable medium described above, the first subset of resources may be modulated according to a higher order modulation scheme than the second subset of resources.

Some examples of the method, apparatus, and non-transitory computer-readable medium described above may further include processes, features, means, or instructions for transmitting a control message in a control region of the first set of resources, where the control message includes an assignment of the resources of the second set for the transmission of the data for the first type of communications. Some examples of the method, apparatus, and non-transitory computer-readable medium described above may further include processes, features, means, or instructions for determining that an amount of data traffic associated with the transmission of the data for the first type of communications exceeds an availability of the first set of resources, where the control message is transmitted based on the determination.

In some examples of the method, apparatus, and non-transitory computer-readable medium described above, the control region includes one or more symbol periods of a TTI of the first set of TTIs. In some examples of the method, apparatus, and non-transitory computer-readable medium described above, the first frequency region of the system bandwidth includes a first number of subcarriers and the second frequency region of the system bandwidth includes a second number of subcarriers.

A method of wireless communication is described. The method may include identifying a first set of resources allocated for control and data signaling for a first type of communications, where the first set of resources includes a first frequency region of a system bandwidth and a first set of TTIs each having a first duration, identifying a second set of resources allocated for control and data signaling for a second type of communications, where the second set of resources includes a second frequency region of the system bandwidth, and communicating on resources of the second set punctured to include the data signaling for the first type of communications based at least in part on a control message received on resources of the first set.

An apparatus for wireless communication is described. The apparatus may include means for identifying a first set of resources allocated for control and data signaling for a first type of communications, where the first set of resources includes a first frequency region of a system bandwidth and a first set of TTIs each having a first duration, means for identifying a second set of resources allocated for control and data signaling for a second type of communications, where the second set of resources includes a second frequency region of the system bandwidth, and means for communicating on resources of the second set punctured to include the data signaling for the first type of communications based at least in part on a control message received on resources of the first set.

Another apparatus for wireless communication is described. The apparatus may include a processor, memory in electronic communication with the processor, and instructions stored in the memory. The instructions may be operable to cause the processor to identify a first set of resources allocated for control and data signaling for a first type of communications, where the first set of resources includes a first frequency region of a system bandwidth and a first set of TTIs each having a first duration, identify a second set of resources allocated for control and data signaling for a second type of communications, where the second set of resources includes a second frequency region of the system bandwidth, and communicate on resources of the second set punctured to include the data signaling for the first type of communications based at least in part on a control message received on resources of the first set.

A non-transitory computer readable medium for wireless communication is described. The non-transitory computer-readable medium may include instructions operable to cause a processor to identify a first set of resources allocated for control and data signaling for a first type of communications, where the first set of resources includes a first frequency region of a system bandwidth and a first set of TTIs each having a first duration, identify a second set of resources allocated for control and data signaling for a second type of communications, where the second set of resources includes a second frequency region of the system bandwidth, and communicate on resources of the second set punctured to include the data signaling for the first type of communications based at least in part on a control message received on resources of the first set.

In some examples of the method, apparatus, and non-transitory computer-readable medium described above, the second frequency region is frequency-division multiplexed with the first frequency region. In some examples of the method, apparatus, and non-transitory computer-readable medium described above, the first type of communications includes communications having a first nominal latency constraint that is less than a second nominal latency constraint for the second type of communications. Some examples of the method, apparatus, and non-transitory computer-readable medium described above may further include processes, features, means, or instructions for receiving the control message in a control region of a TTI of the first set of TTIs, where the control message includes an assignment of resources of the first set and the second set for the communications having the first nominal latency constraint.

In some examples of the method, apparatus, and non-transitory computer-readable medium described above, the control message is received based on an amount of data traffic associated with the first type of communications exceeding an availability of the first set of resources. In some examples of the method, apparatus, and non-transitory computer-readable medium described above, the control region includes one or more symbol periods of the TTI of the first set of TTIs. In some examples of the method, apparatus, and non-transitory computer-readable medium described above, the first type of communications puncture the second set of resources allocated for the second type of communications.

In some examples of the method, apparatus, and non-transitory computer-readable medium described above, the second type of communications includes MBB communications and the second set of resources includes a second set of TTIs each having a second duration that may be an integer multiple of the first duration. In some examples of the method, apparatus, and non-transitory computer-readable medium described above, communicating on resources of the second set includes refraining from communicating on resources of the second set based on an indication in the control message that the resources of the second set are reassigned for the first type of communications.

In some examples of the method, apparatus, and non-transitory computer-readable medium described above, the second set of resources includes a first subset of resources reserved for MBB communications and a second subset of resources available for the first type of communications. In some examples of the method, apparatus, and non-transitory computer-readable medium described above, the first subset of resources may be modulated according to a higher order modulation scheme than the second subset of resources.

DETAILED DESCRIPTION

Figure 1:
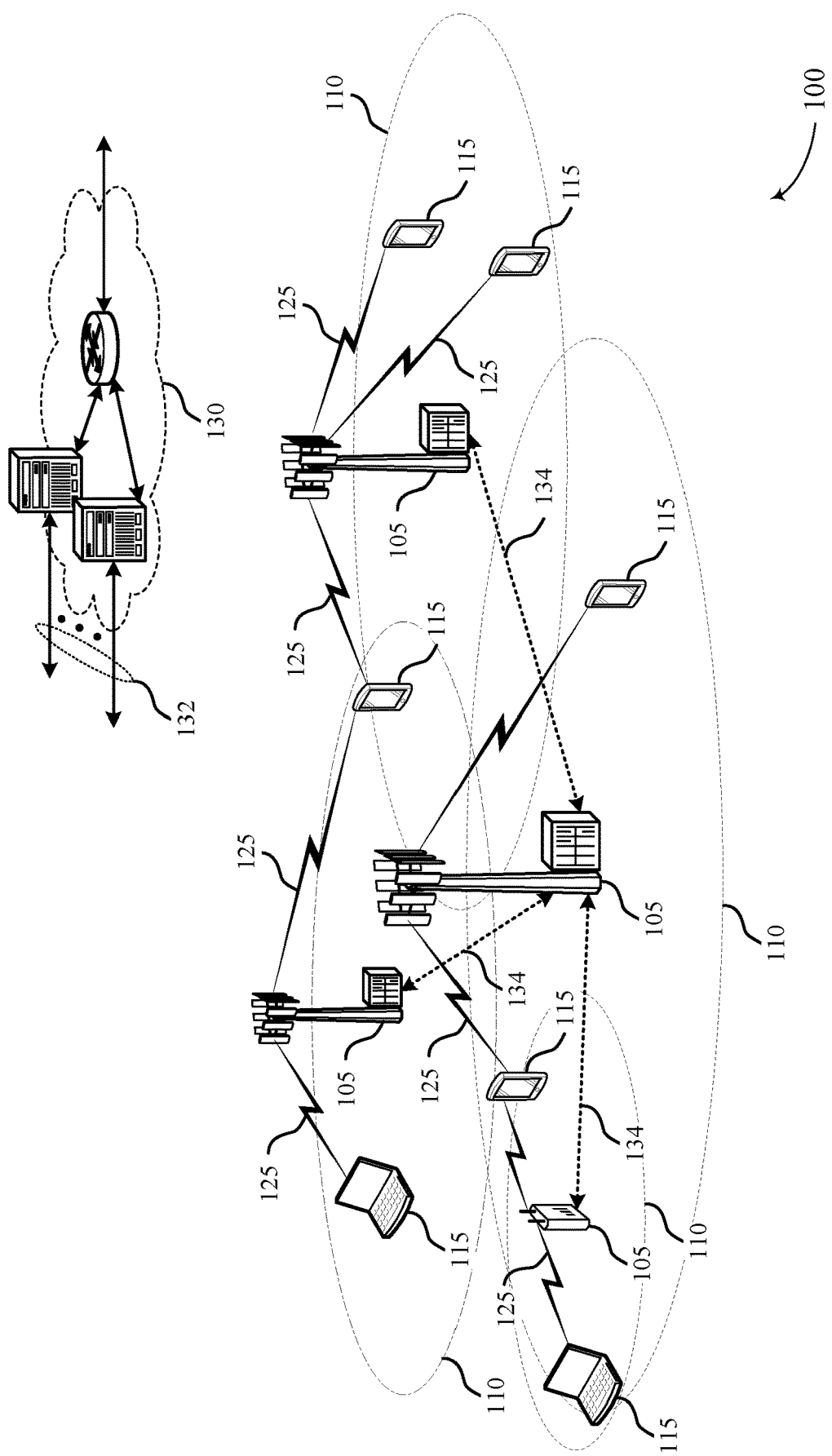
FIG. 1 illustrates an example of a wireless communications system that supports hybrid multiplexing for mission critical (MiCr) information in accordance with various aspects of the present disclosure.

Some wireless communications systems may support low latency (or ultra-low latency) communication (e.g., mission critical (MiCr) communication) associated with high reliability requirements. This type of communication may be referred to as ultra-reliable low latency communication (URLLC) and may be bursty and unpredictable. Wireless communications systems may also support other types of communication (e.g., mobile broadband (MBB) communication or enhanced MBB (eMBB) communication). In some cases, low latency communication may have a higher priority than other types of communication, like MBB/eMMB. Resources used for MBB/eMMB and MiCr communications may therefore be multiplexed in a way that provides for ready reallocation of the resources to accommodate sudden changes in MiCr demand without overly burdening MBB/eMMB communications.

Due to the unpredictability of some low latency applications, the allocation of frequency resources for such applications may be challenging. For example, if a small frequency band is allocated for low latency communication, the reliability of transmissions may be reduced when data traffic is high. Alternatively, if a large frequency band is allocated for low latency communication, some resources may be unused when data traffic is low.

Selecting an appropriate duration for transmission time intervals (TTIs) for these low latency applications may also be challenging. For instance, a base station may allocate TTIs for other types of communication with a user equipment (UE), and the base station may schedule a transmission to that UE on these resources. While communicating with the UE, the base station may identify an unscheduled transmission associated with a low latency application. Since the priority of the low latency transmission may be higher than the priority for the current communication, the base station may interrupt the current communication (e.g., using puncturing) to transmit the unscheduled transmission.

If a low latency application has high data traffic, repeated puncturing may be used to transmit the low latency information, and this may be detrimental to other types of communication. In other words, a base station may transmit MiCr information on resources allocated for MBB/eMBB communications, rather than allocate resources for MiCr communications. However, MiCr transmissions may interfere with MBB communications and reduce the efficiency of the system. As described herein, system resources (e.g., time and frequency resources) may be allocated for MiCr and MBB/eMBB communications in a manner that provides for ready reallocation while minimizing disruption. In some cases, a wireless communications system may support a hybrid multiplexing scheme employing both frequency division multiplexing (FDM) and time division multiplexing (TDM).

By way of example, a first set of resources may be allocated for low latency communication, and a second set of resources may be allocated for other types of communication. Under normal data traffic conditions, a base station may use the first set of resources for low latency communication. However, when data traffic for low latency communication increases spontaneously, the capacity of the first set of resources may be too low to fully accommodate the low latency communications. As such, a base station may puncture the second set of resources for the low latency communication. Although the transmission of low latency information on the second set of resources may still interfere with other types of communication, the amount of interference is reduced when hybrid multiplexing is employed, since puncturing may be used less frequently.

Aspects of the disclosure introduced above are described below in the context of a wireless communications system. Examples of hybrid multiplexing, processes, and signaling exchanges that support MiCr and MBB/eMBB communications are then described. Aspects of the disclosure are further illustrated by and described with reference to apparatus diagrams, system diagrams, and flowcharts that relate to hybrid multiplexing for MiCr information.

FIG. 1 illustrates an example of a wireless communications system 100 that supports hybrid multiplexing for MiCr information in accordance with various aspects of the present disclosure. The wireless communications system 100 includes base stations 105, UEs 115, and a core network 130. In some examples, the wireless communications system 100 may be a long term evolution (LTE) network, a LTE-Advanced (LTE-A) network, or a New Radio (NR) network.

In some cases, wireless communications system 100 may support enhanced broadband communications (e.g., MBB/eMBB, which may be used interchangeably herein), ultra-reliable (e.g., MiCr) communications, low latency communications, and communications with low-cost and low-complexity devices. MiCr communications may be associated with low latency, high reliability, and, in some cases, bursty and unpredictable transmissions. For example, MiCr communications may be associated with a lower latency constraint than other types of communications, such as MBB/eMBB. MiCr communications may also have a higher priority than other types of communications, such as MBB/eMBB.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink channel according to various techniques. Control information and data for one or more types of communications may be multiplexed on a downlink channel, for example, using TDM techniques, FDM techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of a RRC connection between a UE 115 and a network device 105 or core network 130 supporting radio bearers for user plane data. At the Physical (PHY) layer, transport channels may be mapped to physical channels. PHY layer resources (e.g., time and frequency resources) allocated for various communication types may be multiplexed in a hybrid manner in order to accommodate ready reallocation for the resources.

HARQ may be a method employed within wireless communications system 100, which may improve the likelihood that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In incremental redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a NACK indicating a failed attempt to decode the information. The chain of transmission, response and retransmission may be referred to as a HARQ process. In some cases, a limited number of HARQ processes may be used for a given communication link 125.

Time intervals in LTE or NR may be expressed in multiples of a basic time unit (which may be a sampling period of $T_s=1/30{,}720{,}000$ seconds). Time resources may be organized according to radio frames with a length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). In some cases, the numerology employed within a system (i.e., symbol size, subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

A base station 105 and a UE 115 may modulate a signal according to a modulation scheme prior to transmitting the signal. Modulation is the process of representing a digital signal by modifying the properties of a periodic waveform (e.g., frequency, amplitude and phase). Demodulation takes a modified waveform and generates a digital signal. A modulated waveform may be divided into time units known as symbols. Each symbol may be modulated separately. In a wireless communications system that uses narrow frequency subcarriers to transmit distinct symbols, the modulation may be accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with a specific amplitude selected from a finite set.

In the time domain, a TTI may be defined as the smallest unit of time in which a base station 105 may schedule a UE 115 for uplink or downlink transmissions. For example, if a UE 115 is receiving downlink data, then during each TTI a base station 105 may assign resources and indicate (via downlink control transmissions) to the UE 115 where to look for resources that include downlink data. In some cases, such as in a LTE system, a subframe may be the basic unit of scheduling or TTI. In other cases, such as with low latency operation, a different, reduced-duration TTI (e.g., a short TTI) may be used. Wireless communications system 100 may employ various TTI durations, including those that facilitate MiCr and MMB communications, in addition to other types of communication associated with LTE and NR.

A reduced-duration or short TTI (sTTI) may have a duration of a symbol period, a pair of symbol periods, a slot (i.e., half of a subframe), or other durations less than 1 ms. For example, a TTI used for MBB communications may have a duration of a slot (i.e., 0.5 ms), and a TTI used for MiCr communication may have a shorter duration (e.g., 0.125 ms). TTIs for low latency operation may thus have a numerology that is compatible with other LTE transmission structures and timing (e.g., subframe), although the numerology may be different from that of LTE. Similarly, TTIs for other low latency or ultra-low latency (ULL) operation may have a numerology that is compatible with other low latency structures and timing (e.g., a slot). The wireless communications system 100 may concurrently support communication using TTIs with different durations (e.g., TTIs having a duration of a subframe and TTIs having a duration of a symbol period or a slot).

In some examples, different types of communications (e.g., MBB communications and MiCr communications) may be multiplexed in the frequency domain. For example, a first frequency region may be semi-statically configured for MBB communications and a second frequency region may be semi-statically configured for MiCr communications. The use of FDM for orthogonal communication in wireless communications system 100 may prevent interference between MiCr communications and MBB communications. However, since MiCr communications may be bursty and unpredictable, allocation of resources for MiCr communications using FDM may be challenging. For example, restriction of the frequency band allocated for MiCr communications may limit the capacity for MiCr communications, and generous allocation of frequency resources for MiCr communications may result in wasted resources.

In other examples, different types of communications (e.g., MBB communications and MiCr communications) may be multiplexed in the time domain. For example, a base station 105 may allocate a set of TTIs for MBB communication. The base station may then identify information for MiCr communications and transmit the information over a portion of the TTIs allocated for MBB communication. That is, the base station may puncture a current TTI being used for MBB communication for a low latency MiCr transmission with a higher priority. When a base station punctures a MBB TTI for MiCr communications, MBB transmissions scheduled on the punctured resources may be lost.

Accordingly, a base station 105 and a UE 115 may employ various techniques to mitigate the effects of puncturing. For example, wireless communications system 100 may utilize code block level FEC and HARQ techniques (e.g., with MAC layer coding) to recover code blocks punctured for MiCr transmissions. Additionally, wireless communications system 100 may use a link adaptation framework to identify an appropriate MCS for MBB transmissions based on MiCr traffic to minimize the effects of MiCr interference. The MCS may be selected based on a pattern of stationary interference from MiCr transmissions and a duty cycle associated with bursty interference from MiCr transmissions. Further, wireless communications system 100 may use a specific coding scheme (e.g., low-density parity-check (LDPC) coding) to minimize the effects of puncturing.

However, if the data traffic for MiCr communications is high, the use of puncturing may still be detrimental to MBB communications. Further, for MiCr communications, a UE may monitor all resources allocated for MBB communication for a MiCr transmission, and this may result in increased complexity and power consumption at the UE.

Wireless communications system 100 may support techniques for efficient use of a wireless spectrum with minimum interference between different types of communications (e.g., MBB communications and MiCr communications). For example, wireless communications system 100 may support a hybrid multiplexing scheme employing both FDM and TDM. A first set of resources including a first frequency region and a first set of TTIs may be allocated for MBB communications and a second set of resources including a second frequency region and a second set of TTIs may be allocated for MiCr communications. A wireless device may identify information for MiCr communications and transmit the information over the second set of resources allocated for MiCr communications. However, in some cases, the capacity of the second set of resources allocated for MiCr communications may be too low when MiCr data traffic is high. In such cases, a base station may puncture the MBB resources for a MiCr transmission. Therefore, the use of hybrid multiplexing for MiCr information may support improved coordination between different types of communications in wireless communications system 100.

Figure 2:
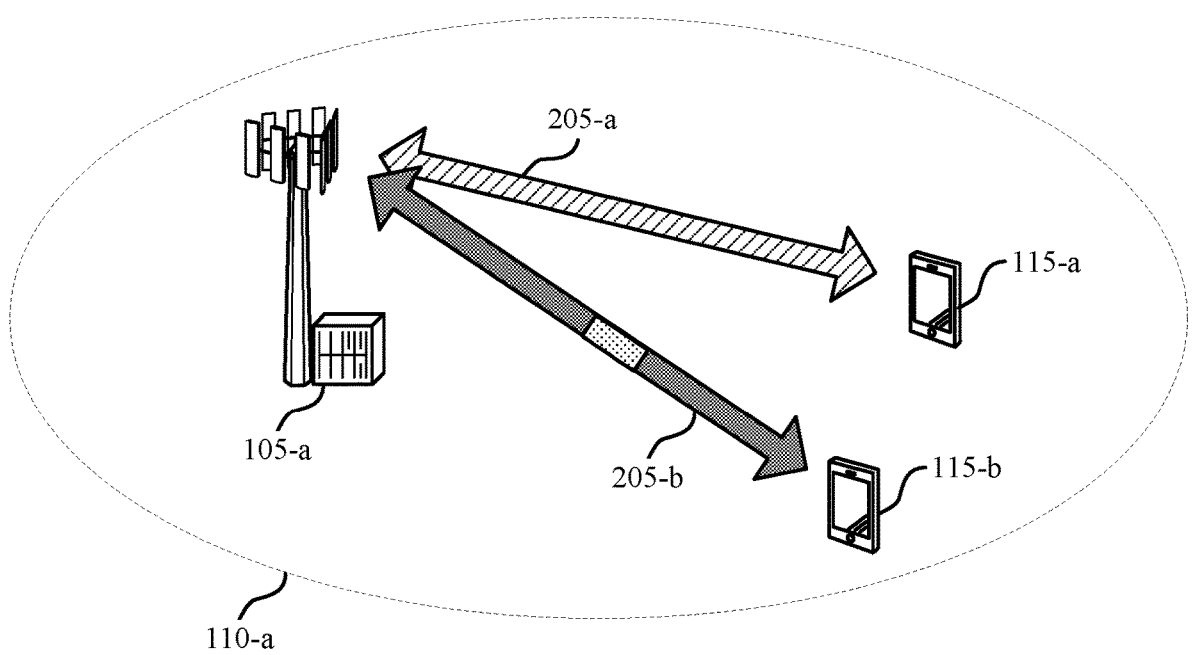
FIG. 2 illustrates an example of a wireless communications system that supports hybrid multiplexing for MiCr information in accordance with various aspects of the present disclosure.

FIG. 2 illustrates an example of a wireless communications system 200 that supports hybrid multiplexing for MiCr information in accordance with various aspects of the present disclosure. Wireless communications system 200 may include base station 105-a, which may be an example of a base station 105 described with reference to FIG. 1. Wireless communications system 200 may also include first UE 115-a and second UE 115-b, which may be examples of a UE 115 described with reference to FIG. 1. Base station 105-a may provide communication coverage for a respective coverage area 110-a, which may be an example of a coverage area 110 described with reference to FIG. 1. In some cases, base station 105-a may schedule MiCr communications 210 with first UE 115-a over a first carrier 205-a. Base station 105-a may also schedule MBB communications 215 with second UE 115-b over a second carrier 205-b.

In some cases, MiCr communications 210 and MBB communications 215 may be multiplexed in the frequency domain according to FDM techniques. For example, first carrier 205-a designated for MiCr communications 210 may span a first frequency region of a system bandwidth, and second carrier 205-b designated for MBB communications 215 may span a second frequency region of the system bandwidth.

In some examples, the first frequency region of the first carrier 205-a may be configured (e.g., dynamically or semi-statically) based on a pattern of data traffic associated with MiCr communications. First carrier 205-a may span a smaller set of subcarriers than second carrier 205-b, since, in most cases, MBB communications may be associated with higher data traffic than MiCr communications. Although, in most cases, data traffic for MiCr communications may be relatively low, MiCr communications may be associated with higher reliability, lower latency, and higher priority than MBB communications. Therefore, if base station 105-a or first UE 115-a identifies that there is above-average data traffic for MiCr communications, base station 105-a and first UE 115-a may, for example, transmit MiCr information over second carrier 205-b (e.g., MiCr puncturing communications 220).

Accordingly, MBB communications 215 and MiCr puncturing communications 220 may be multiplexed in the time domain according to TDM techniques. In some examples, first carrier 205-a may span a first set of TTIs, and second carrier 205-b may span a second set of TTIs. The duration of the TTIs used for MiCr communications 210 may be shorter than the duration of the TTIs used for MBB communications 215. Further, the numerology of the TTIs used for MiCr communications 210 may be compatible with the numerology used for MBB communications 215. Specifically, a first number of TTIs (e.g., 4) of the first set of TTIs used for MiCr communications 210 may be an integer multiple of a second number of TTIs (e.g., 1) of the second set of TTIs used for MBB communications 215. That is, the duration of each TTI in the second set of TTIs used for MBB communications 215 (e.g., 0.5 ms) may be an integer multiple of the duration of each TTI in the first set of TTIs used for MiCr communications 210 (e.g., 0.125 ms), and the boundaries of a TTI used for MBB communications 215 may align with the boundaries of TTIs used for MiCr communications 210.

In some cases, a base station 105-a may transmit control information over first carrier 205-a indicating resources for MiCr puncturing communications 220 on carrier 205-b. The control channel may span a number of symbols in a TTI used for MiCr communications 210. First UE 115-a may monitor the control channel and identify the resources to use for MiCr puncturing communications 220 over second carrier 205-b. Second UE 115-b may also monitor the control channel and refrain from communicating over the resources used for MiCr puncturing communications 220. By refraining from communicating over these resources, second UE 115-b may achieve a decoding gain. The use of puncturing for facilitating MiCr puncturing communications 220 may still interfere with MBB transmissions in wireless communications system 200. However, the amount of interference may be reduced compared to a system employing TDM techniques only, since puncturing may be used less frequently when hybrid multiplexing techniques are employed.

Furthermore, to reduce the effects of puncturing on MBB communications 215, a first portion of the bandwidth spanned by second carrier 205-b may be reserved for MBB transmissions and a second portion of the bandwidth spanned by second carrier 205-b may be available for MiCr transmissions (i.e., puncturing). Base station 105-a and second UE 115-b may modulate MBB transmissions across the first portion reserved for MBB transmissions according to a higher modulation scheme than the second portion available for MiCr transmissions. Accordingly, less information may be lost when the second set of resources are punctured for MiCr puncturing communications 220.

The example described with reference to FIG. 2 discusses improved procedures for allocating resources for MiCr communications 210 and MBB communications 215. However, the above example is also applicable for different types of communications with varying TTI durations and priorities. Additionally, although this example is described using different UEs, the described techniques are also applicable for different types of communication at the same UE.

Figure 3:
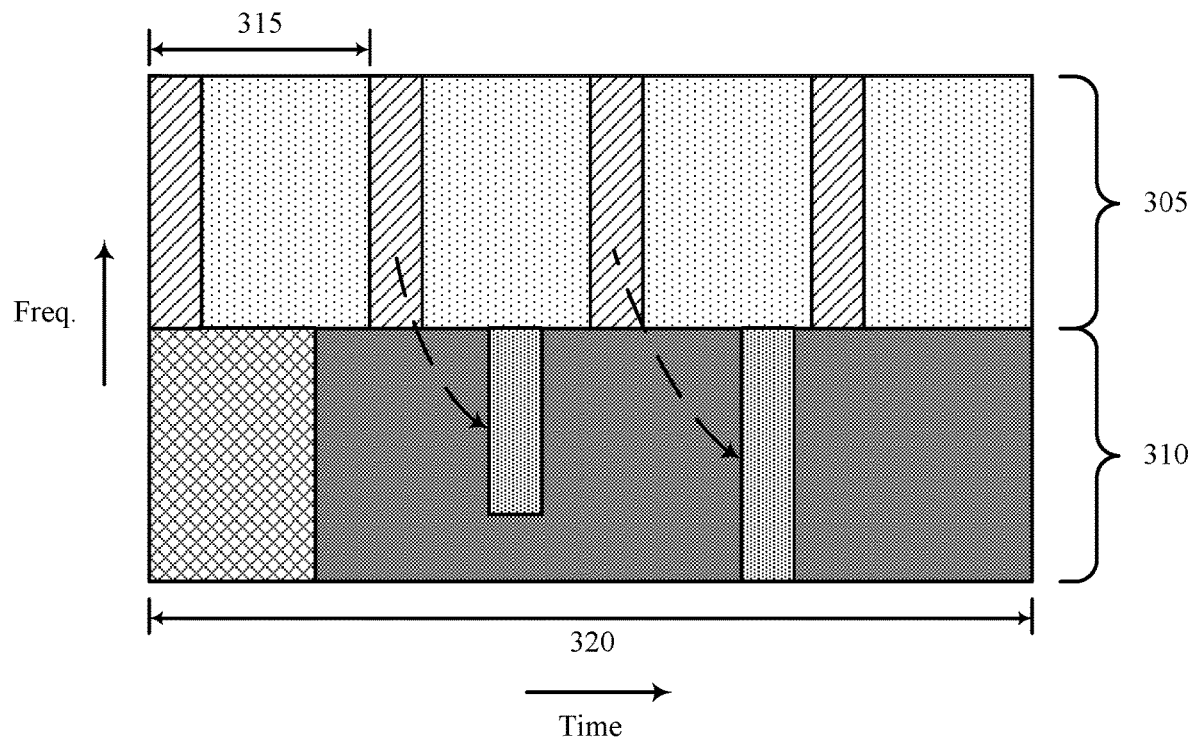
FIG. 3 illustrates an example of a hybrid multiplexing scheme in a system that supports hybrid multiplexing for MiCr information in accordance with various aspects of the present disclosure.

FIG. 3 illustrates an example of a hybrid multiplexing scheme 300 in a system that supports hybrid multiplexing for MiCr information in accordance with various aspects of the present disclosure. A wireless communications system may allocate a first set of resources for MiCr communications and a second set of resources for MBB communications. The first set of resources may include a first frequency region 305 and a first number of TTIs (e.g., four (4) TTIs), and the second set of resources may include a second frequency region 310 and a second number of TTIs (e.g., one (1) TTI). In some cases, the second frequency region 310 may be larger than the first frequency region 305. That is, the second frequency region 310 may span more subcarriers than the first frequency region 305.

The frequency band for MiCr communications and MBB communications may be dynamically allocated (e.g., in a previous TTI) or semi-statically configured (e.g., using RRC signaling). In some examples, a TTI of the first number of TTIs may have a duration 315 that is shorter than a duration 320 of a TTI of the second number of TTIs. In some examples, the duration 320 (e.g., 0.5 ms) may be an integer multiple of the duration 315 (e.g., 0.125 ms). That is, the first number of TTIs (e.g., 4) may be an integer multiple of the second number of TTIs (e.g., 1), and each boundary of each TTI of the second number of TTIs may align with a boundary of a TTI of the first number of TTIs.

Each TTI of the first set of TTIs allocated for MiCr communications may include a MiCr control channel 325 and a MiCr data channel 330, and each TTI of the second set of TTIs allocated for MBB communication may include a MBB control channel 335 and a MBB data channel 340. A base station may use the MiCr control channel 325 to transmit control information to a UE including, for example, a grant of resources for use in communicating with the UE over the MiCr data channel 330. Similarly, a base station may use the MBB control channel 335 to transmit control information to a UE including, for example, a grant of resources for use in communicating with the UE over the MBB data channel 340. In some cases, the data traffic associated with MiCr communications may increase instantaneously, and the capacity of the first set of resources for MiCr communications may not be sufficient to support the increased data traffic. In such cases, a base station may allocate a portion of the second set of resources for MiCr communications.

In the example of FIG. 3, a base station may include a control message in a MiCr control channel 325 indicating that a portion of the second set of resources are reallocated for MiCr communications (i.e., MiCr puncturing resources 345). As shown, the base station may include the first control message in a second TTI of the first set of TTIs, and the base station may puncture the second frequency region 310 for the MiCr communications in the second TTI. Similarly, the base station may include a second control message in a third TTI of the first set of TTIs, and the base station may puncture the second frequency region 310 for the MiCr communications in the third TTI. The MiCr communications over MiCr puncturing resources 345 may interfere with MBB communications scheduled over MBB data channel 340. In order to mitigate the effects of the interference, a MBB UE may monitor the control region of the MiCr TTI (e.g., MiCr control channel 325) and identify that a portion of the second set of resources are reallocated for MiCr communications. The MBB UE may then refrain from communicating over the MiCr puncturing resources 345 to avoid interference with the MiCr communications.

Figure 4:
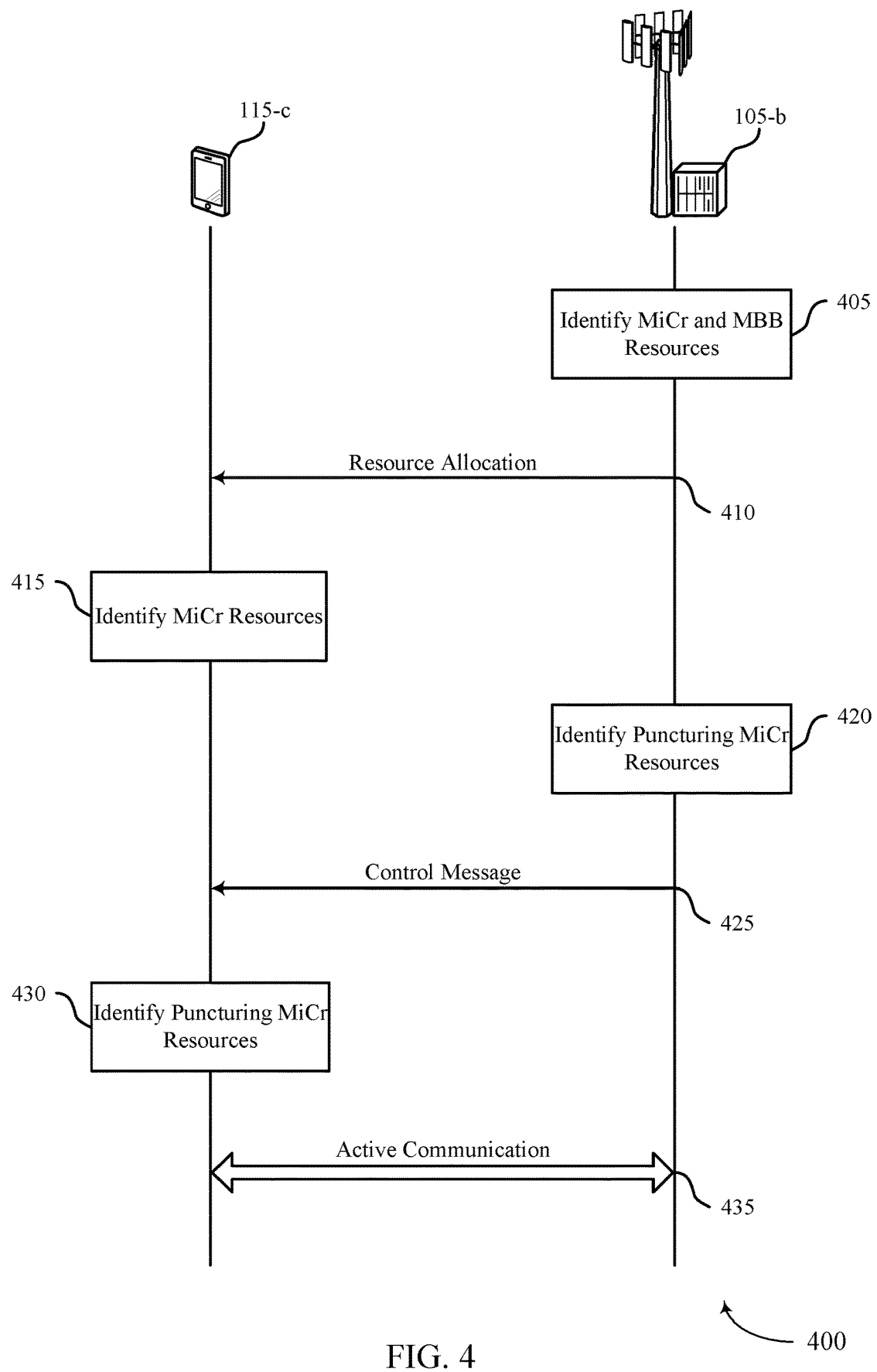
FIG. 4 illustrates an example of a process flow in a system that supports hybrid multiplexing for MiCr information in accordance with various aspects of the present disclosure.

FIG. 4 illustrates an example of a process flow 400 in a system that supports hybrid multiplexing for MiCr information in accordance with various aspects of the present disclosure. In some cases, process flow 400 may represent aspects of techniques performed by a UE 115 or a base station 105 as described with reference to FIGS. 1 and 2.

At 405, base station 105-b may identify a first set of resources allocated for MiCr communications and a second set of resources allocated for MBB communications. In some cases, the first set of resources may include a first frequency region of a system bandwidth and a first set of TTIs each having a first duration. The first frequency region of the system bandwidth may include a first number of subcarriers. In some examples, base station 105-b may identify the first set of resources allocated for MiCr communications based on a pattern of data traffic associated with the MiCr communications.

Further, the second set of resources may include a second frequency region of the system bandwidth and a second set of TTIs each having a second duration that is an integer multiple of the first duration. The second frequency region of the system bandwidth may include a second number of subcarriers. In some cases, the second set of resources may include a first subset of resources reserved for MBB communications and a second subset of resources available for MiCr communications. In such cases, MBB communication over the first subset of resources may be modulated according to a higher modulation order than MBB communication over the second subset of resources.

At 410, base station 105-b may transmit a resource allocation to UE 115-c indicating the first set of resources allocated for MiCr communications. At 415, UE 115-c may identify the first set of resources allocated for MiCr communications based on the resource allocation received at 410. At 420, base station 105-b may identify puncturing MiCr resources based on, for example, increased data traffic associated with MiCr communications.

At 425, base station 105-b may transmit a control message to UE 115-c in a control region of the first set of resources. The control message may include an assignment of resources of the second set for a transmission of MiCr information. In some cases, the control message is transmitted based on an amount of data traffic associated with the MiCr communications exceeding an availability of the first set of resources. In some cases, the control region may include one or more symbol periods of a TTI of the first set of TTIs. At 430, UE 115-c may identify the puncturing MiCr resources based on the assignment of resources of the second set included in the control message received at 425.

At 435, base station 105-b may actively communicate with UE 115-c. That is, base station 105-b may exchange MiCr data transmissions (e.g., MiCr information) with UE 115-c over the first set of resources and resources of the second set of resources reassigned for MiCr communications. In some cases, transmitting MiCr information may include puncturing the second set of resources for the transmission of the MiCr information. In some examples, another UE (not shown) may receive the control message in the control region of the first set of resources and refrain from communicating on the resources of the second set of resources used for MiCr communications. The base station 105-*b* and UE 115-*c* may transmit MiCr information on the second subset of resources available for MiCr communications rather than the first subset of resources reserved for MBB communications.

Figure 5:
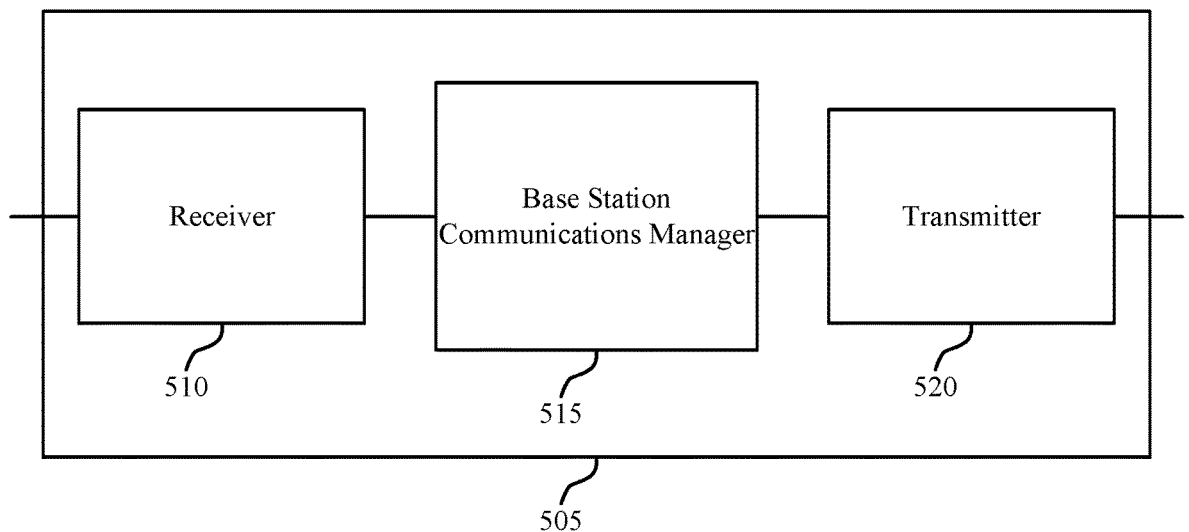
FIGS. 5-7 show block diagrams of a device or devices that support hybrid multiplexing for MiCr information in accordance with various aspects of the present disclosure.

FIG. 5 shows a block diagram 500 of a wireless device 505 that supports hybrid multiplexing for MiCr information in accordance with various aspects of the present disclosure. Wireless device 505 may be an example of aspects of a base station 105 as described with reference to FIG. 1. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to hybrid multiplexing for MiCr information, etc.). Information may be passed on to other components of the device. The receiver 510 may be an example of aspects of the transceiver 835 described with reference to FIG. 8.

Base station communications manager 515 may be an example of aspects of the base station communications manager 815 described with reference to FIG. 8. Base station communications manager 515 may identify a first set of resources allocated for control and data signaling for a first type of communications having a first nominal latency constraint, where the first set of resources includes a first frequency region of a system bandwidth and a first set of TTIs each having a first duration, identify a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint.

Transmitter 520 may transmit signals generated by other components of the device. Transmitter 520 may transmit data for the first type of communications on resources of the second set of resources. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
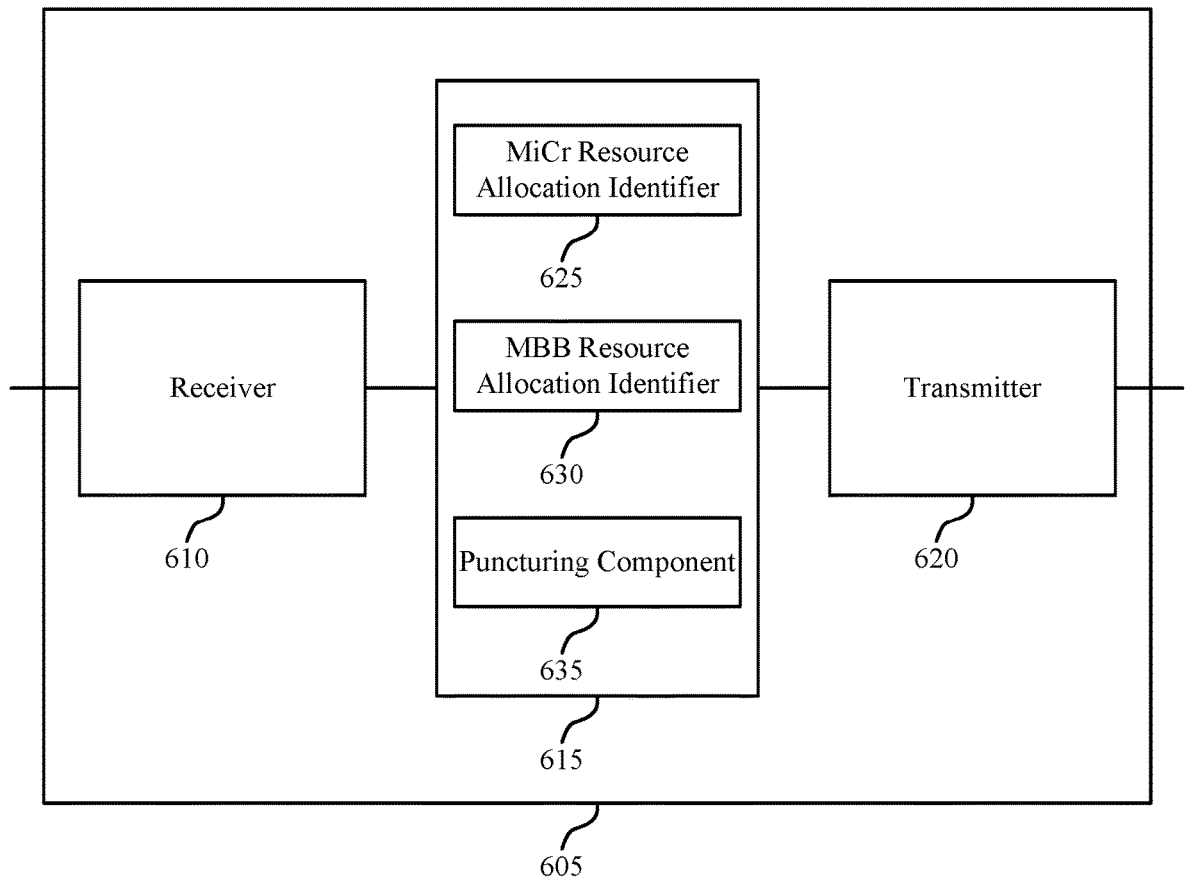

FIG. 6 shows a block diagram 600 of a wireless device 605 that supports hybrid multiplexing for MiCr information in accordance with various aspects of the present disclosure. Wireless device 605 may be an example of aspects of a wireless device 505 or a base station 105 as described with reference to FIGS. 1 and 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to hybrid multiplexing for MiCr information, etc.). Information may be passed on to other components of the device. The receiver 610 may be an example of aspects of the transceiver 835 described with reference to FIG. 8.

Base station communications manager 615 may be an example of aspects of the base station communications manager 815 described with reference to FIG. 8. Base station communications manager 615 may also include MiCr resource allocation identifier 625, MBB resource allocation identifier 630, and puncturing component 635.

MiCr resource allocation identifier 625 may identify a first set of resources allocated for control and data signaling for a first type of communications having a first nominal latency constraint, where the first set of resources includes a first frequency region of a system bandwidth and a first set of TTIs each having a first duration. In some cases, the first frequency region of the system bandwidth includes a first number of subcarriers. MBB resource allocation identifier 630 may identify a second set of resources allocated for control and data signaling for a second type of communications, where the second set of resources includes a second frequency region of the system bandwidth and a second set of TTIs each having a second duration that is an integer multiple of the first duration, and where the first nominal latency constraint is less than the second nominal latency constraint. In some cases, the second set of resources includes a first subset of resources reserved for the second type of communications and a second subset of resources available for the first type of communications. In some cases, the second frequency region of the system bandwidth includes a second number of subcarriers. In some cases, the second frequency region is frequency-division multiplexed with the first frequency region.

Puncturing component 635 may transmit data for the first type of communications on resources of the second set of resources. In some cases, transmitting the data for the first type of communications on resources of the second set of resources includes puncturing the second set of resources for the transmission of the data for the first type of communications. In some cases, transmitting the data for the first type of communications includes transmitting the data for the first type of communications on the second subset of resources available for the first type of communications.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
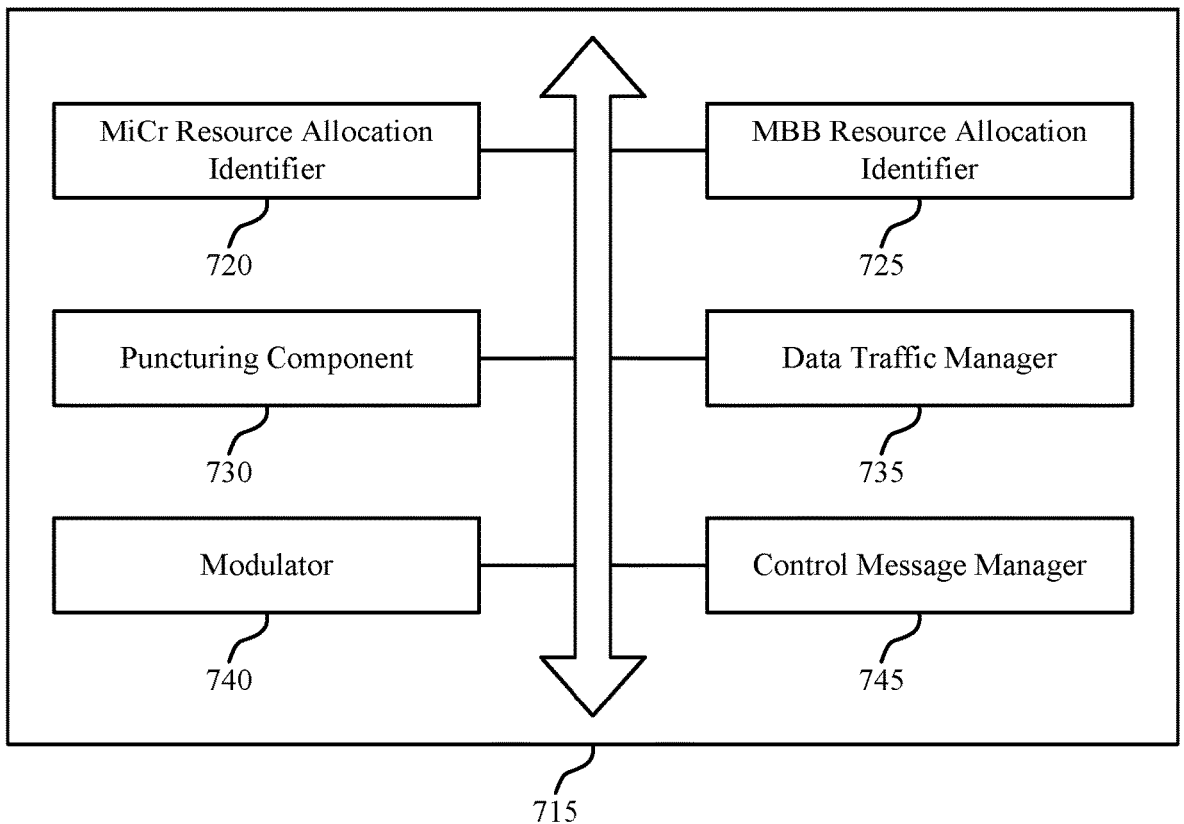

FIG. 7 shows a block diagram 700 of a base station communications manager 715 that supports hybrid multiplexing for MiCr information in accordance with various aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include MiCr resource allocation identifier 720, MBB resource allocation identifier 725, puncturing component 730, data traffic manager 735, modulator 740, and control message manager 745. Each of these modules may communicate, directly or indirectly, with one another (e.g., via one or more buses).

MiCr resource allocation identifier 720 may identify a first set of resources allocated for control and data signaling for a first type of communications having a first nominal latency constraint, where the first set of resources includes a first frequency region of a system bandwidth and a first set of TTIs each having a first duration. In some cases, the first frequency region of the system bandwidth includes a first number of subcarriers. MBB resource allocation identifier 725 may identify a second set of resources allocated for control and data signaling for a second type of communications having a second nominal latency constraint, where the second set of resources includes a second frequency region of the system bandwidth and a second set of TTIs each having a second duration that is an integer multiple of the first duration, and where the first nominal latency constraint is less than the second nominal latency constraint. In some cases, the second set of resources includes a first subset of resources reserved for the second type of communications and a second subset of resources available for the first type of communications. In some cases, the second frequency region of the system bandwidth includes a second number of subcarriers. In some cases, the second frequency region is frequency-division multiplexed with the first frequency region.

Puncturing component 730 may transmit data for the first type of communications on resources of the second set of resources. In some cases, transmitting the data for the first type of communications on resources of the second set of resources includes puncturing the second set of resources for the transmission of the data for the first type of communications. In some cases, transmitting the data for the first type of communications includes transmitting the data for the first type of communications on the second subset of resources available for the first type of communications.

Modulator 740 may modulate transmissions on the first subset of resources reserved for the second type of communications according to a higher order modulation scheme than transmissions on the second subset of resources available for the first type of communications. Control message manager 745 may transmit a control message in a control region of the first set of resources, where the control message includes an assignment of the resources of the second set for the transmission of the data for the first type of communications. In some cases, the control region includes one or more symbol periods of a TTI of the first set of TTIs.

Data traffic manager 735 may determine that an amount of data traffic associated with the transmission of the data for the first type of communications exceeds an availability of the first set of resources, where the control message is transmitted based on the determination. Data traffic manager 735 may also identify a pattern of data traffic associated with the first type of communications. Data traffic manager may then pass this information to MiCr resource allocation identifier 720. In some cases, MiCr resource allocation identifier 720 may use this information to identify the first set of resources allocated for control and data signaling for the first type of communications based on the pattern of data traffic associated with the first type of communications.

Figure 8:
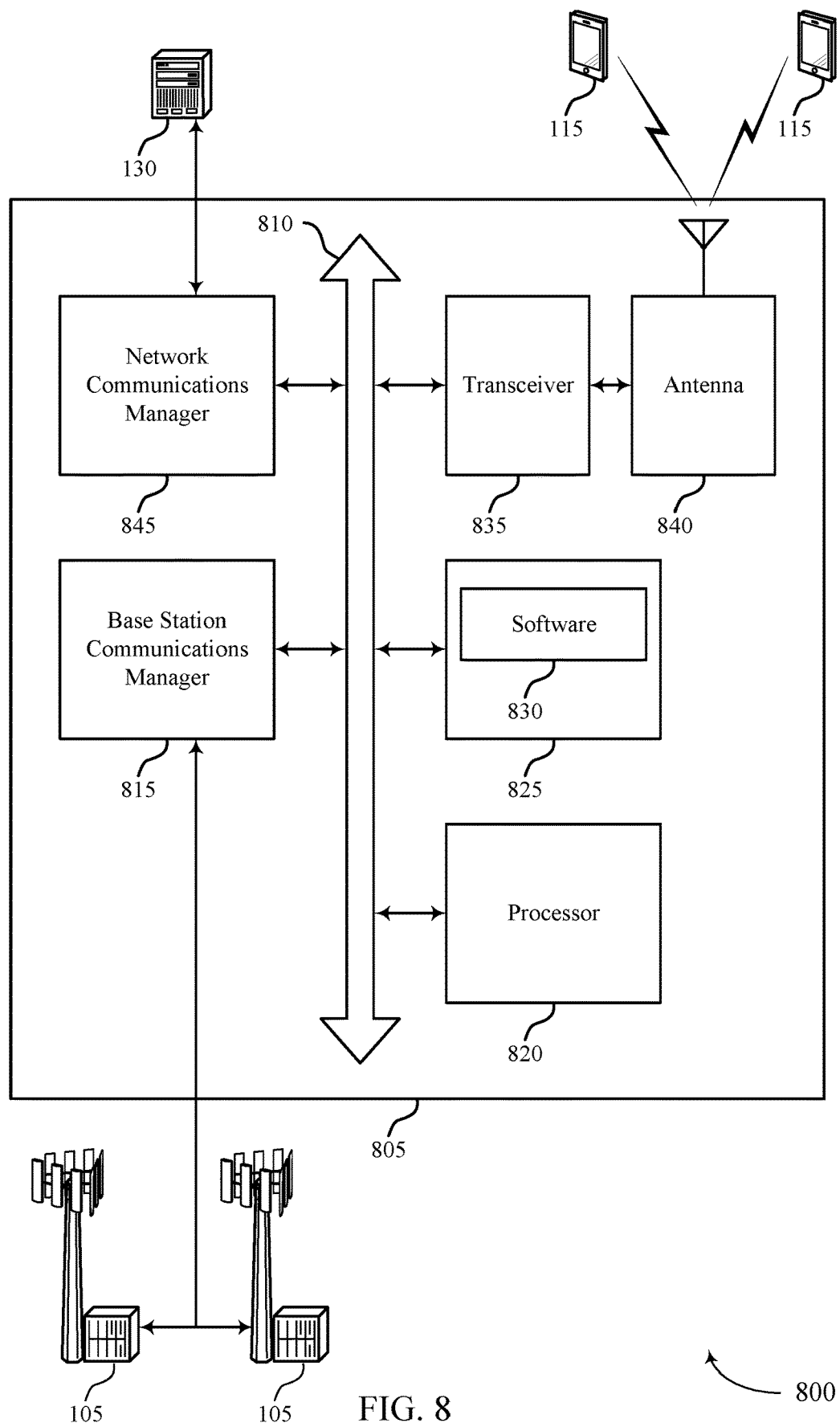
FIG. 8 illustrates a block diagram of a system, including a base station, that supports hybrid multiplexing for MiCr information in accordance with various aspects of the present disclosure.

FIG. 8 shows a diagram of a system 800 including a device 805 that supports hybrid multiplexing for MiCr information in accordance with various aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station communications manager 815, processor 820, memory 825, software 830, transceiver 835, antenna 840, and network communications manager 845. These components may be in electronic communication via one or more busses (e.g., bus 810). Device 805 may communicate wirelessly with one or more UEs 115.

Base station communications manager 815 may manage communications with other base station 105, and may include a controller or scheduler for controlling communications with UEs 115 in cooperation with other base stations 105. For example, the base station communications manager 815 may coordinate scheduling for transmissions to UEs 115 for various interference mitigation techniques such as beamforming or joint transmission. In some examples, base station communications manager 815 may provide an X2 interface within an LTE/LTE-A wireless communication network technology to provide communication between base stations 105.

Processor 820 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting hybrid multiplexing for MiCr information).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support hybrid multiplexing for MiCr information. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Figure 9:
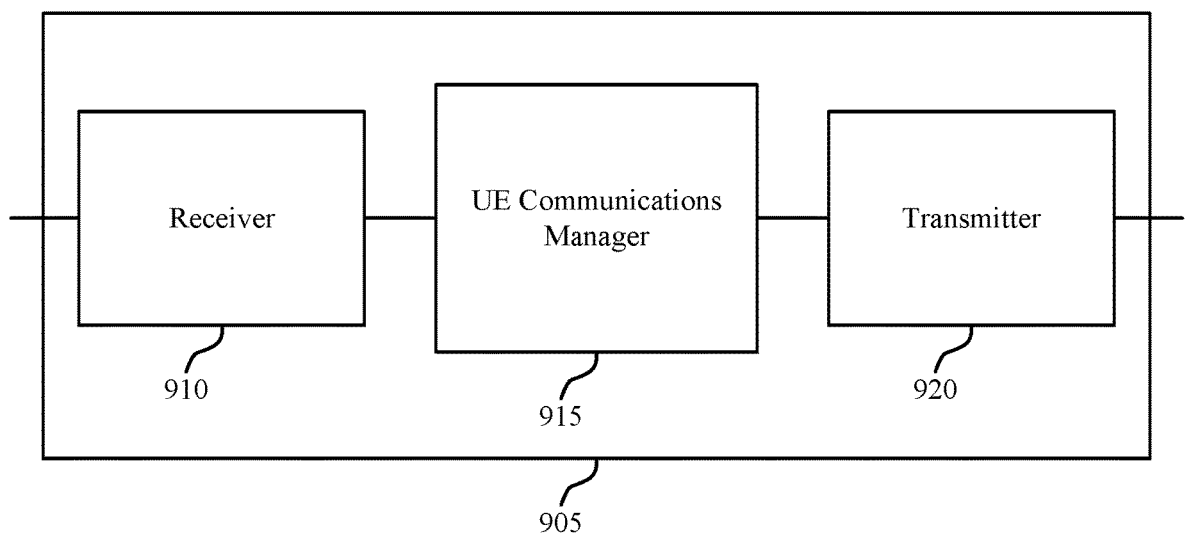
FIGS. 9-11 show block diagrams of a device or devices that support hybrid multiplexing for MiCr information in accordance with various aspects of the present disclosure.

FIG. 9 shows a block diagram 900 of a wireless device 905 that supports hybrid multiplexing for MiCr information in accordance with various aspects of the present disclosure. Wireless device 905 may be an example of aspects of a UE 115 as described with reference to FIG. 1. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to hybrid multiplexing for MiCr information, etc.). Information may be passed on to other components of the device. The receiver 910 may be an example of aspects of the transceiver 1235 described with reference to FIG. 12.

UE communications manager 915 may be an example of aspects of the UE communications manager 1215 described with reference to FIG. 12. UE communications manager 915 may identify a first set of resources allocated for control and data signaling for a first type of communications, where the first set of resources includes a first frequency region of a system bandwidth and a first set of TTIs each having a first duration, identify a second set of resources allocated for control and data signaling for a second type of communications, where the second set of resources includes a second frequency region of the system bandwidth, and, in combination with receiver 910 and transmitter 920, communicate on resources of the second set punctured to include the data signaling for the first type of communications based at least in part on a control message received on resources of the first set.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
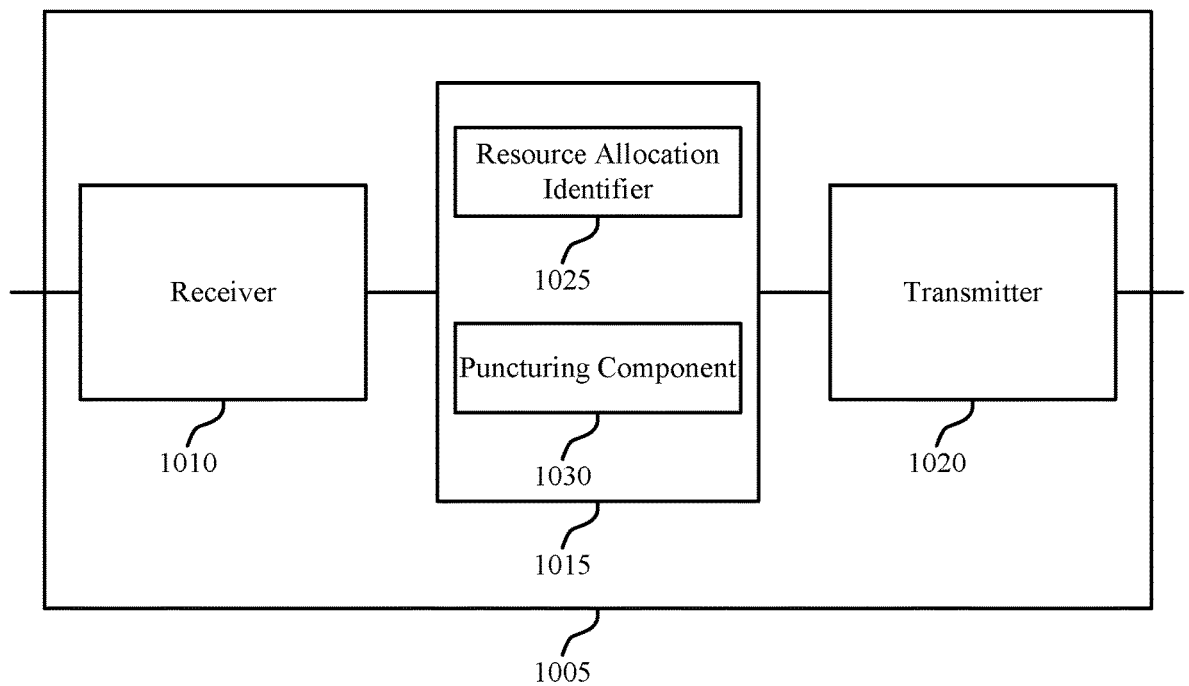

FIG. 10 shows a block diagram 1000 of a wireless device 1005 that supports hybrid multiplexing for MiCr information in accordance with various aspects of the present disclosure. Wireless device 1005 may be an example of aspects of a wireless device 905 or a UE 115 as described with reference to FIGS. 1 and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to hybrid multiplexing for MiCr information, etc.). Information may be passed on to other components of the device. The receiver 1010 may be an example of aspects of the transceiver 1235 described with reference to FIG. 12.

UE communications manager 1015 may be an example of aspects of the UE communications manager 1215 described with reference to FIG. 12. UE communications manager 1015 may include resource allocation identifier 1025 and puncturing component 1030.

Resource allocation identifier 1025 may identify a first set of resources allocated for control and data signaling for a first type of communications, where the first set of resources includes a first frequency region of a system bandwidth and a first set of TTIs each having a first duration and identify a second set of resources allocated for control and data signaling for a second type of communications, where the second set of resources includes a second frequency region of the system bandwidth. In some cases, the second frequency region is frequency-division multiplexed with the first frequency region. In some cases, the first type of communications includes communications having a first nominal latency constraint that is less than a second nominal latency constraint for the second type of communications. In some cases, the second type of communications includes MBB communications and the second set of resources includes a second set of TTIs each having a second duration that is an integer multiple of the first duration. In some cases, the second set of resources includes a first subset of resources reserved for MBB communications and a second subset of resources available for the first type of communications.

Puncturing component 1030 may communicate on resources of the second set punctured to include the data signaling for the first type of communications based at least in part on a control message received on resources of the first set. In some cases, the first type of communications may puncture the second set of resources allocated for the second type of communications. In some cases, communicating on resources of the second set includes refraining from communicating on resources of the second set based on an indication in the control message that the resources of the second set are reassigned for the first type of communications.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
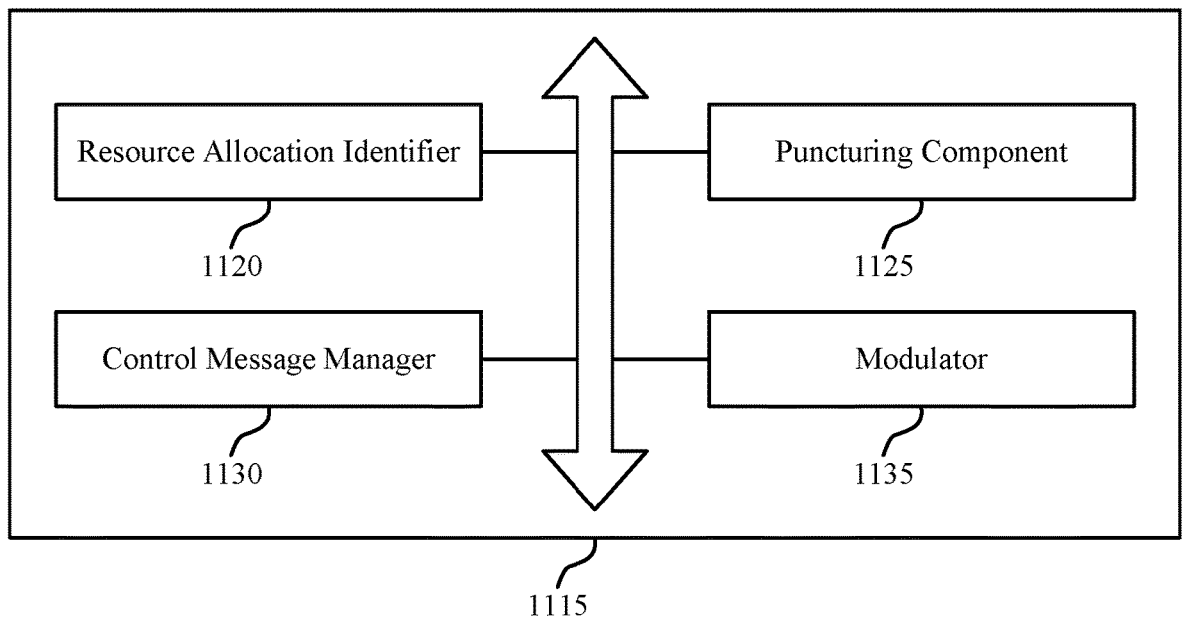

FIG. 11 shows a block diagram 1100 of a UE communications manager 1115 that supports hybrid multiplexing for MiCr information in accordance with various aspects of the present disclosure. The UE communications manager 1115 may be an example of aspects of a UE communications manager 1215 described with reference to FIGS. 9, 10, and 12. The UE communications manager 1115 may include resource allocation identifier 1120, puncturing component 1125, control message manager 1130, and modulator 1135. Each of these modules may communicate, directly or indirectly, with one another (e.g., via one or more buses).

Resource allocation identifier 1120 may identify a first set of resources allocated for control and data signaling for a first type of communications, where the first set of resources includes a first frequency region of a system bandwidth and a first set of TTIs each having a first duration and identify a second set of resources allocated for control and data signaling for a second type of communications, where the second set of resources includes a second frequency region of the system bandwidth. In some cases, the first type of communications includes communications having a first nominal latency constraint that is less than a second nominal latency constraint for the second type of communications. In some cases, the second type of communications includes MBB communications and the second set of resources includes a second set of TTIs each having a second duration that is an integer multiple of the first duration. In some cases, the second set of resources includes a first subset of resources reserved for MBB communications and a second subset of resources available for the first type of communications.

Puncturing component 1125 may communicate on resources of the second set punctured to include the data signaling for the first type of communications based at least in part on a control message received on resources of the first set. In some cases, the first type of communications punctures the second set of resources allocated for the second type of communications. In some cases, communicating on resources of the second set includes refraining from communicating on resources of the second set based on an indication in the control message that the resources of the second set are reassigned for the first type of communications.

Control message manager 1130 may receive the control message in a control region of a TTI of the first set of TTIs, where the control message includes an assignment of resources of the first set and the second set for the communications having the first nominal latency constraint. In some cases, the control message is received based on an amount of data traffic associated with the first type of communications exceeding an availability of the first set of resources. In some cases, the control region includes one or more symbol periods of the TTI of the first set of TTIs. Modulator 1135 may modulate transmissions on the first subset of resources reserved for MBB communications according to a higher order modulation scheme than transmissions on the second subset of resources available for the first type of communications.

Figure 12:
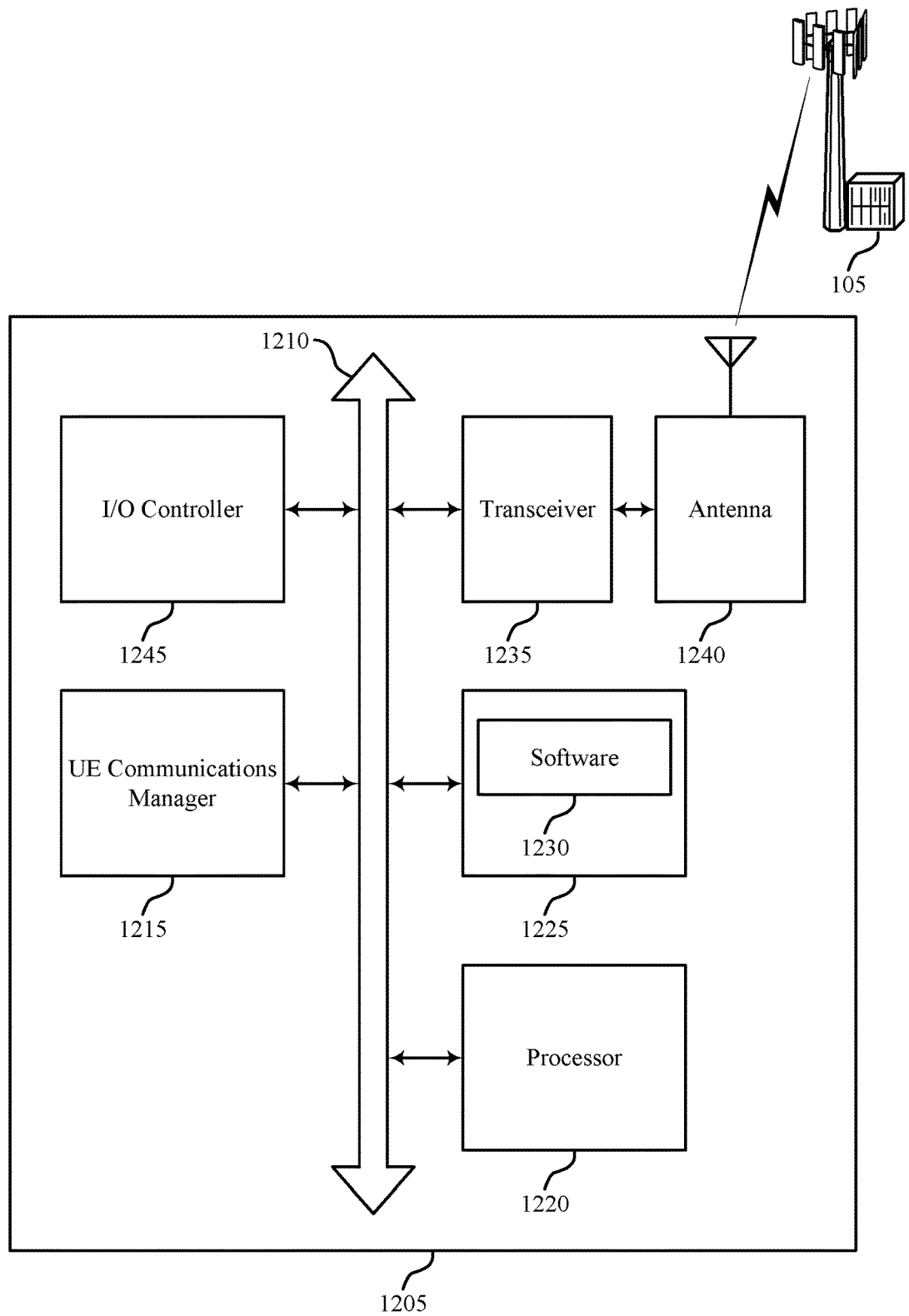
FIG. 12 illustrates a block diagram of a system, including a device, that supports hybrid multiplexing for MiCr information in accordance with various aspects of the present disclosure.

FIG. 12 shows a diagram of a system 1200 including a device 1205 that supports hybrid multiplexing for MiCr information in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting hybrid multiplexing for MiCr information).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support hybrid multiplexing for MiCr information. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
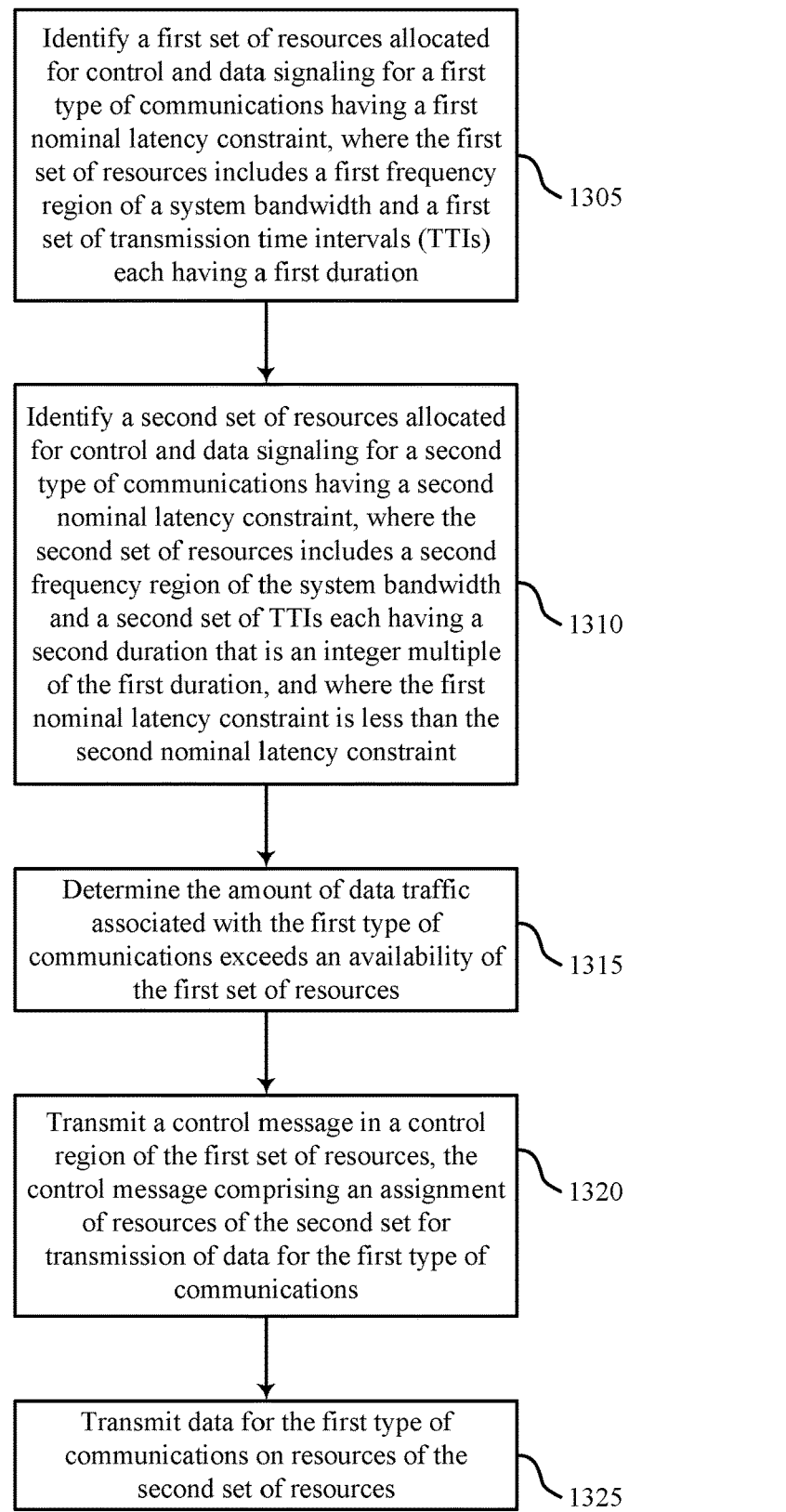
FIGS. 13-16 illustrate methods for hybrid multiplexing for MiCr information in accordance with various aspects of the present disclosure.

FIG. 13 shows a flowchart illustrating a method 1300 for hybrid multiplexing for MiCr information in accordance with various aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305, the base station 105 may identify a first set of resources allocated for control and data signaling for a first type of communications having a first nominal latency constraint, wherein the first set of resources comprises a first frequency region of a system bandwidth and a first set of TTIs each having a first duration. The operations of block 1305 may be performed according to the methods described with reference to FIGS. 1 through 4. In certain examples, aspects of the operations of block 1305 may be performed by a MiCr resource allocation identifier as described with reference to FIGS. 5 through 8.

At block 1310, the base station 105 may identify a second set of resources allocated for control and data signaling for a second type of communications having a second nominal latency constraint, wherein the second set of resources comprises a second frequency region of the system bandwidth and a second set of TTIs each having a second duration that is an integer multiple of the first duration, and wherein the first nominal latency constraint is less than the second nominal latency constraint. The operations of block 1310 may be performed according to the methods described with reference to FIGS. 1 through 4. In certain examples, aspects of the operations of block 1310 may be performed by a MBB resource allocation identifier as described with reference to FIGS. 5 through 8.

At block 1315, the base station 105 may determine that an amount of data traffic associated with the first type of communications exceeds an availability of the first set of resources. The operations of block 1315 may be performed according to the methods described with reference to FIGS. 1 through 4. In certain examples, aspects of the operations of block 1315 may be performed by a data traffic manager as described with reference to FIGS. 5 through 8.

At block 1320, the base station 105 may transmit a control message in a control region of the first set of resources, where the control message comprises an assignment of the resources of the second set for the transmission of the data for the first type of communications. The operations of block 1320 may be performed according to the methods described with reference to FIGS. 1 through 4. In certain examples, aspects of the operations of block 1320 may be performed by a control message manager as described with reference to FIGS. 5 through 8.

At block 1325, the base station 105 may transmit data for the first type of communications on resources of the second set of resources. The operations of block 1325 may be performed according to the methods described with reference to FIGS. 1 through 4. In certain examples, aspects of the operations of block 1325 may be performed by a puncturing component as described with reference to FIGS. 5 through 8.

Figure 14:
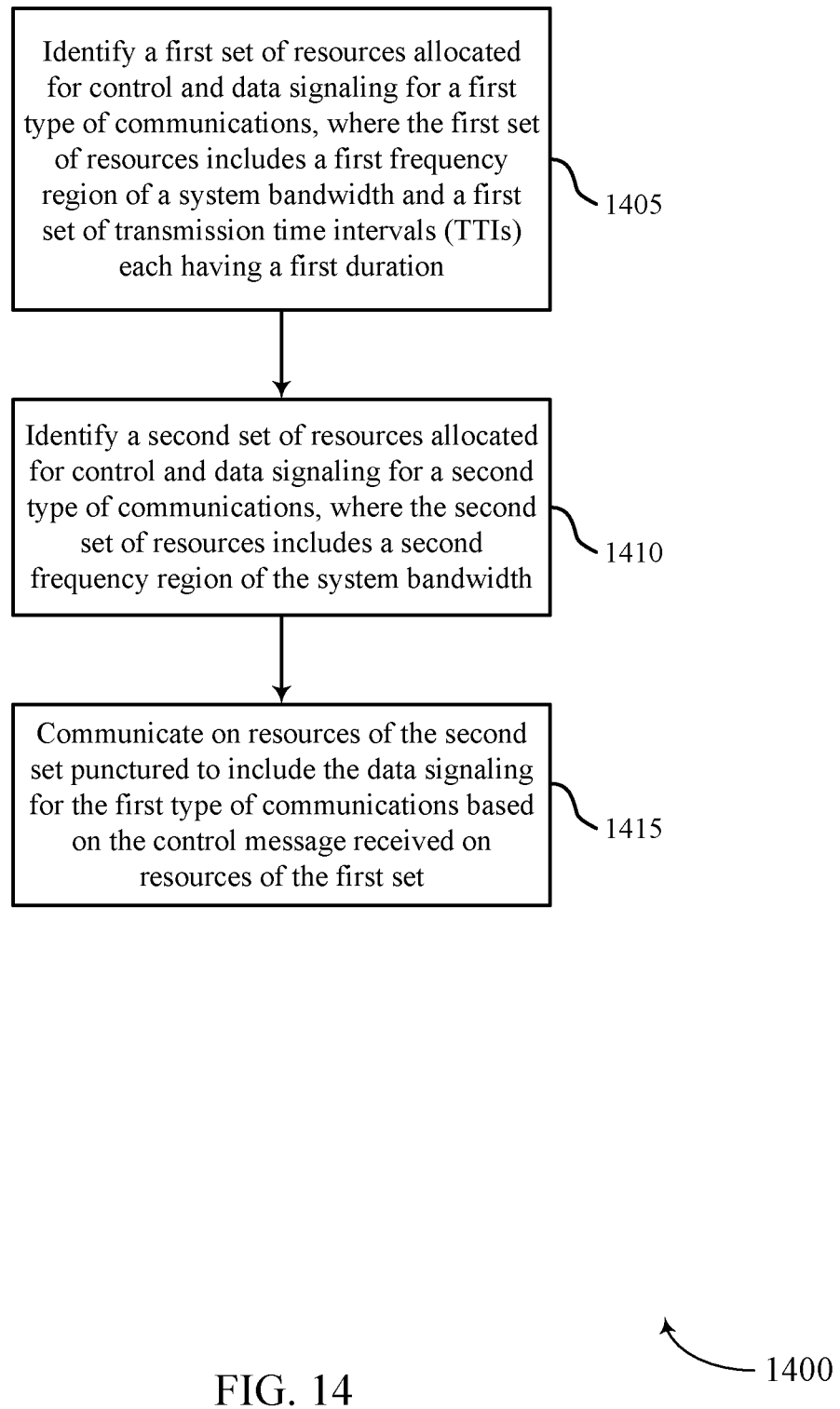

FIG. 14 shows a flowchart illustrating a method 1400 for hybrid multiplexing for MiCr information in accordance with various aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may identify a first set of resources allocated for control and data signaling for a first type of communications, wherein the first set of resources comprises a first frequency region of a system bandwidth and a first set of TTIs each having a first duration. The operations of block 1405 may be performed according to the methods described with reference to FIGS. 1 through 4. In certain examples, aspects of the operations of block 1405 may be performed by a resource allocation identifier as described with reference to FIGS. 9 through 12.

At block 1410, the UE 115 may identify a second set of resources allocated for control and data signaling for a second type of communications, wherein the second set of resources comprises a second frequency region of the system bandwidth. The operations of block 1410 may be performed according to the methods described with reference to FIGS. 1 through 4. In certain examples, aspects of the operations of block 1410 may be performed by a resource allocation identifier as described with reference to FIGS. 9 through 12.

At block 1415, the UE 115 may communicate on resources of the second set punctured to include the data signaling for the first type of communications based at least in part on a control message received on resources of the first set. The operations of block 1415 may be performed according to the methods described with reference to FIGS. 1 through 4. In certain examples, aspects of the operations of block 1415 may be performed by a puncturing component as described with reference to FIGS. 9 through 12.

Figure 15:
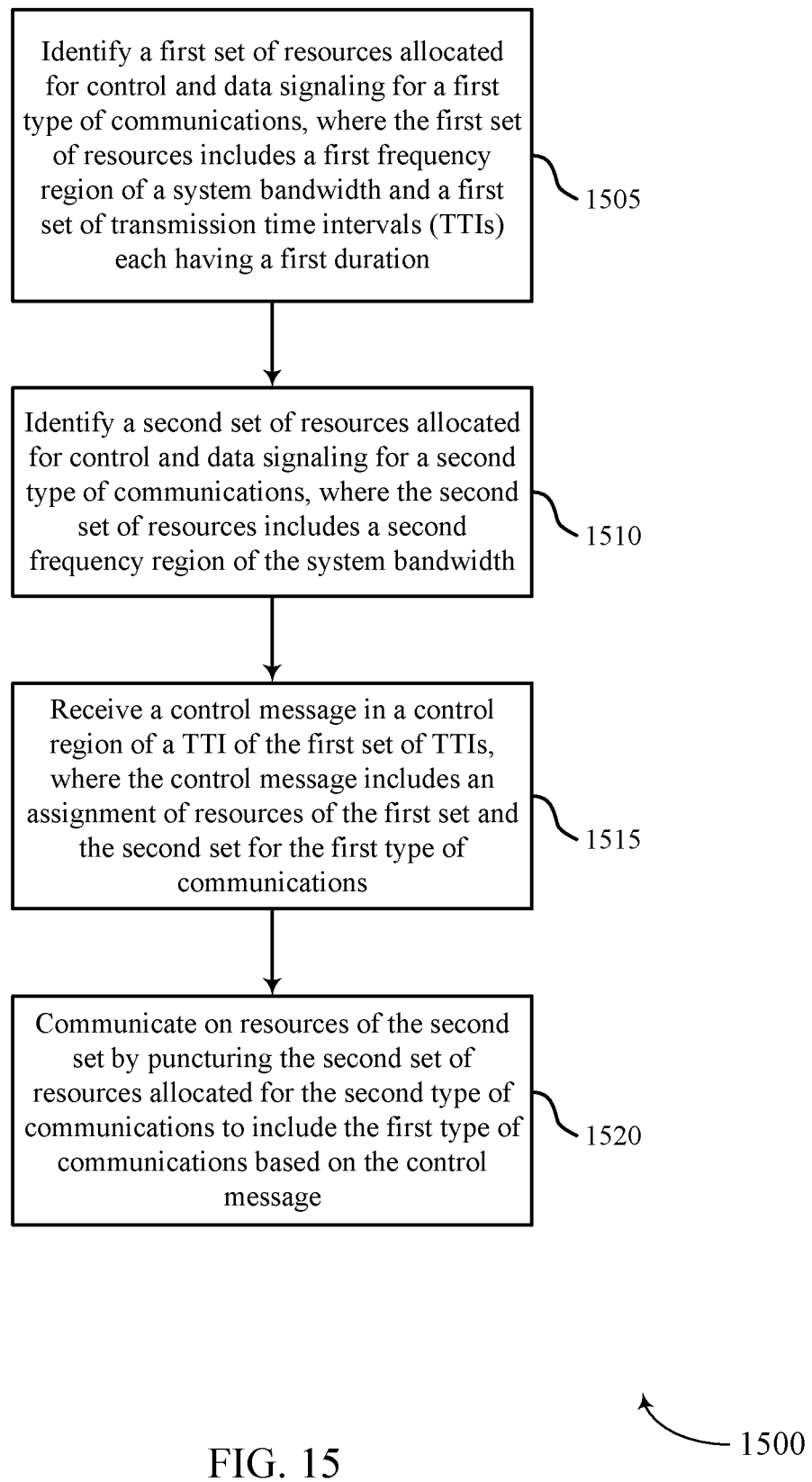

FIG. 15 shows a flowchart illustrating a method 1500 for hybrid multiplexing for MiCr information in accordance with various aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may identify a first set of resources allocated for control and data signaling for a first type of communications, wherein the first set of resources comprises a first frequency region of a system bandwidth and a first set of TTIs each having a first duration. The operations of block 1505 may be performed according to the methods described with reference to FIGS. 1 through 4. In certain examples, aspects of the operations of block 1505 may be performed by a resource allocation identifier as described with reference to FIGS. 9 through 12.

At block 1510, the UE 115 may identify a second set of resources allocated for control and data signaling for a second type of communications, wherein the second set of resources comprises a second frequency region of the system bandwidth. The operations of block 1510 may be performed according to the methods described with reference to FIGS. 1 through 4. In certain examples, aspects of the operations of block 1510 may be performed by a resource allocation identifier as described with reference to FIGS. 9 through 12.

At block 1515, the UE 115 may receive a control message in a control region of a TTI of the first set of TTIs, wherein the control message includes an assignment of resources of the first set and the second set for the first type of communications. The operations of block 1515 may be performed according to the methods described with reference to FIGS. 1 through 4. In certain examples, aspects of the operations of block 1515 may be performed by a control message manager as described with reference to FIGS. 9 through 12.

At block 1520, the UE 115 may communicate on resources of the second set by puncturing the second set of resources allocated for the second type of communications to include the first type of communications based on the control message. The operations of block 1520 may be performed according to the methods described with reference to FIGS. 1 through 4. In certain examples, aspects of the operations of block 1520 may be performed by a puncturing component as described with reference to FIGS. 9 through 12.

Figure 16:
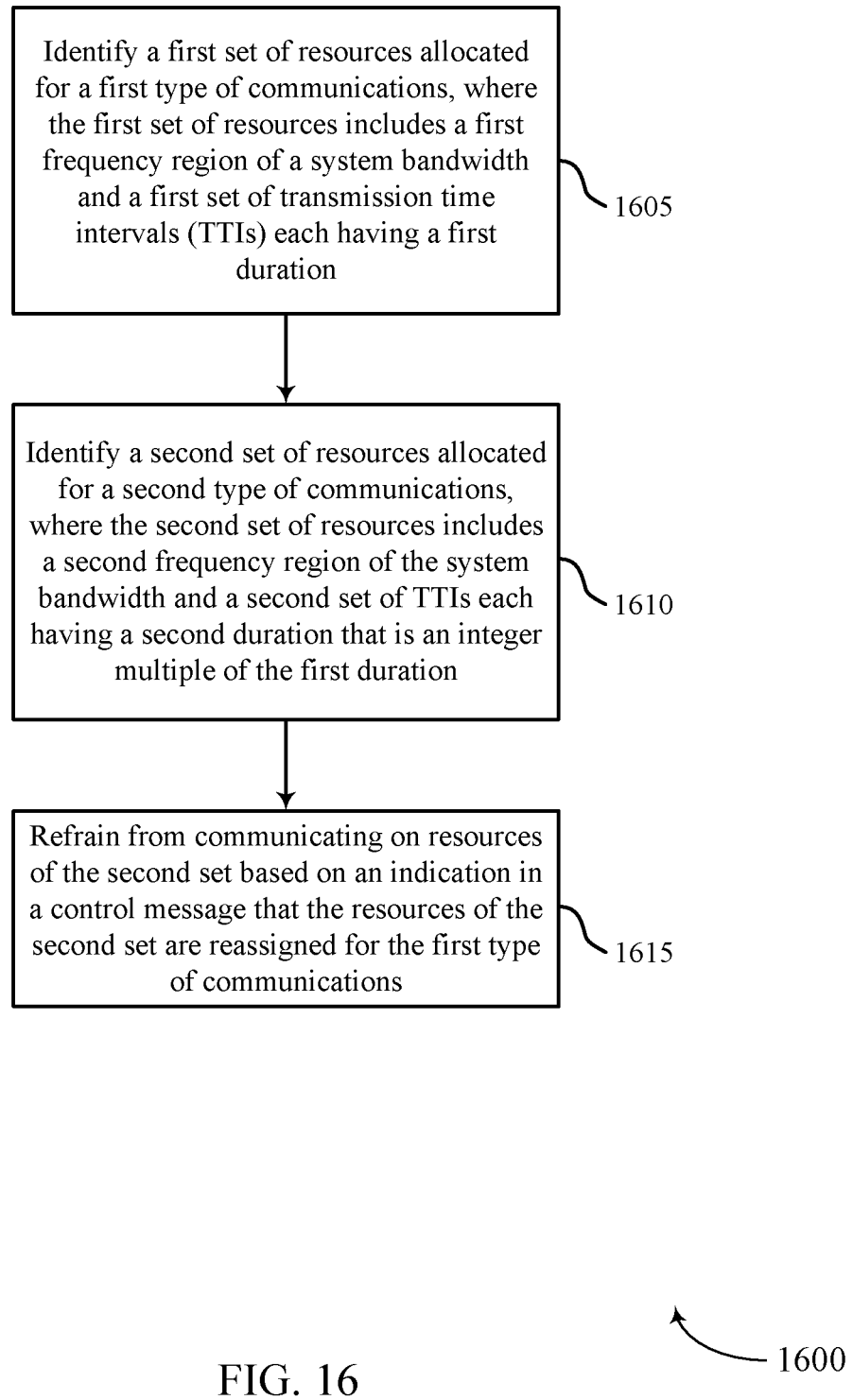

FIG. 16 shows a flowchart illustrating a method 1600 for hybrid multiplexing for MiCr information in accordance with various aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may identify a first set of resources allocated for control and data signaling for a first type of communications, wherein the first set of resources comprises a first frequency region of a system bandwidth and a first set of TTIs each having a first duration. The operations of block 1605 may be performed according to the methods described with reference to FIGS. 1 through 4. In certain examples, aspects of the operations of block 1605 may be performed by a resource allocation identifier as described with reference to FIGS. 9 through 12.

At block 1610, the UE 115 may identify a second set of resources allocated for control and data signaling for a second type of communications, wherein the second set of resources comprises a second frequency region of the system bandwidth and a second set of TTIs each having a second duration that is an integer multiple of the first duration. The operations of block 1610 may be performed according to the methods described with reference to FIGS. 1 through 4. In certain examples, aspects of the operations of block 1610 may be performed by a resource allocation identifier as described with reference to FIGS. 9 through 12.

At block 1615, the UE 115 may refrain from communicating on resources of the second set based on an indication in a control message that the resources of the second set are reassigned for the first type of communications. The operations of block 1615 may be performed according to the methods described with reference to FIGS. 1 through 4. In certain examples, aspects of the operations of block 1615 may be performed by a puncturing component as described with reference to FIGS. 9 through 12.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of a LTE system or a NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first set of resources allocated for a first control channel and a first data channel for a first type of communications, wherein the first set of resources spans a first frequency region of a system bandwidth and comprises a first set of transmission time intervals (TTIs) each having a first duration;
   identifying a second set of resources allocated for a second control channel and a second data channel for a second type of communications, wherein the second set of resources spans a second frequency region of the system bandwidth, the second frequency region being different than the first frequency region; and communicating on resources of the second set punctured to include data signaling for the first type of communications based at least in part on a control message received on the first control channel of the first set of resources.

2. The method of claim 1, wherein the second frequency region is frequency-division multiplexed with the first frequency region.

3. The method of claim 1, wherein the first type of communications comprises communications having a first nominal latency constraint that is less than a second nominal latency constraint for the second type of communications.

4. The method of claim 3, further comprising:
receiving the control message in a control region of a TTI of the first set of TTIs allocated for the first control channel, wherein the control message comprises an assignment of resources of the first set and the second set for communications having the first nominal latency constraint.

5. The method of claim 4, wherein the control message is received based at least in part on an amount of data traffic associated with the first type of communications exceeding an availability of the first set of resources.

6. The method of claim 4, wherein the control region comprises one or more symbol periods of the TTI of the first set of TTIs.

7. The method of claim 4, wherein the first type of communications punctures the second set of resources allocated for the second type of communications.

8. The method of claim 1, wherein the second type of communications comprises mobile broadband (MBB) communications and the second set of resources comprises a second set of TTIs each having a second duration that is an integer multiple of the first duration.

9. The method of claim 8, wherein communicating on resources of the second set comprises:
refraining from communicating on resources of the second set based at least in part on an indication in the control message that the resources of the second set are reassigned for the first type of communications.

10. The method of claim 8, wherein the second set of resources comprises a first subset of resources reserved for MBB communications and a second subset of resources available for the first type of communications.

11. The method of claim 10, wherein the first subset of resources is modulated according to a higher order modulation scheme than the second subset of resources.

12. A method for wireless communication, comprising:
identifying a first set of resources allocated for a first control channel and a first data channel for a first type of communications having a first nominal latency constraint, wherein the first set of resources spans a first frequency region of a system bandwidth and comprises a first set of transmission time intervals (TTIs) each having a first duration;
identifying a second set of resources allocated for a second control channel and a second data channel for a second type of communications having a second nominal latency constraint, wherein the second set of resources spans a second frequency region of the system bandwidth and comprises a second set of TTIs each having a second duration that is an integer multiple of the first duration, wherein the second frequency region is different than the first frequency region and the first nominal latency constraint is less than the second nominal latency constraint; and
transmitting data for the first type of communications on resources of the second set of resources.

13. The method of claim 12, wherein the second frequency region is frequency-division multiplexed with the first frequency region.

14. The method of claim 12, wherein transmitting the data for the first type of communications on resources of the second set of resources comprises:
puncturing the second set of resources for the transmission of the data for the first type of communications.

15. The method of claim 12, wherein identifying the first set of resources allocated for the first control channel and the first data channel for the first type of communications comprises:
identifying the first set of resources allocated for the first control channel and the first data channel for the first type of communications based at least in part on a pattern of data traffic associated with the first type of communications.

16. The method of claim 12, wherein the second set of resources comprises a first subset of resources reserved for the second type of communications and a second subset of resources available for the first type of communications.

17. The method of claim 16, wherein transmitting the data for the first type of communications comprises:
transmitting the data for the first type of communications on the second subset of resources available for the first type of communications.

18. The method of claim 16, wherein the first subset of resources is modulated according to a higher order modulation scheme than the second subset of resources.

19. The method of claim 12, further comprising:
transmitting a control message in a control region of the first set of resources allocated for the first control channel, wherein the control message comprises an assignment of the resources of the second set for the transmission of the data for the first type of communications.

20. The method of claim 19, further comprising:
determining that an amount of data traffic associated with the transmission of the data for the first type of communications exceeds an availability of the first set of resources, wherein the control message is transmitted based at least in part on the determination.

21. The method of claim 19, wherein the control region comprises one or more symbol periods of a TTI of the first set of TTIs.

22. An apparatus for wireless communication, in a system comprising:
a processor;
memory in electronic communication with the processor; and
instructions stored in the memory and operable, when executed by the processor, to cause the apparatus to:
identify a first set of resources allocated for a first control channel and a first data channel for a first type of communications, wherein the first set of resources spans a first frequency region of a system bandwidth and comprises a first set of transmission time intervals (TTIs) each having a first duration;
identify a second set of resources allocated for a second control channel and a second data channel for a second type of communications, wherein the second set of resources spans a second frequency region of the system bandwidth, the second frequency region being different than the first frequency region; and communicate on resources of the second set punctured to include data signaling for the first type of communications based at least in part on a control message received on the first control channel of the first set of resources.

23. The apparatus of claim 22, wherein the first type of communications comprises communications having a first nominal latency constraint that is less than a second nominal latency constraint for the second type of communications.

24. The apparatus of claim 23, wherein the instructions are further executable by the processor to cause the apparatus to:

receive the control message in a control region of a TTI of the first set of TTIs allocated for the first control channel, wherein the control message comprises an assignment of resources of the first set and the second set for the communications having the first nominal latency constraint.

25. The apparatus of claim 24, wherein the control message is received based at least in part on an amount of data traffic associated with the first type of communications exceeding an availability of the first set of resources.

26. The apparatus of claim 24, wherein the first type of communications punctures the second set of resources allocated for the second type of communications.

27. The apparatus of claim 22, wherein the second type of communications comprises mobile broadband (MBB) communications and the second set of resources comprises a second set of TTIs each having a second duration that is an integer multiple of the first duration.

28. The apparatus of claim 27, wherein the instructions are further executable by the processor to cause the apparatus to:

refrain from communicating on resources of the second set based at least in part on an indication in the control message that the resources of the second set are reassigned for the first type of communications.

29. The apparatus of claim 27, wherein the second set of resources comprises a first subset of resources reserved for MBB communications and a second subset of resources available for the first type of communications.

30. An apparatus for wireless communication, in a system comprising:

a processor;

memory in electronic communication with the processor; and instructions stored in the memory and operable, when executed by the processor, to cause the apparatus to:

identify a first set of resources allocated for a first control channel and a first data channel for a first type of communications having a first nominal latency constraint, wherein the first set of resources spans a first frequency region of a system bandwidth and comprises a first set of transmission time intervals (TTIs) each having a first duration;

identify a second set of resources allocated for a second control channel and a second data channel for a second type of communications having a second nominal latency constraint, wherein the second set of resources spans a second frequency region of the system bandwidth and comprises a second set of TTIs each having a second duration that is an integer multiple of the first duration, wherein the second frequency region is different than the first frequency region and the first nominal latency constraint is less than the second nominal latency constraint; and transmit data for the first type of communications on resources of the second set of resources.

\* \* \* \* \*